(12) United States Patent
Baggett et al.

(10) Patent No.: US 8,566,151 B2
(45) Date of Patent: *Oct. 22, 2013

(54) CO-PAY OPTIONS FOR FREQUENT TRAVELER AWARD REDEMPTION BY RULE

(75) Inventors: David M. Baggett, Natick, MA (US); Rodney S. Daughtrey, Cambridge, MA (US); Daniel J. Thumim, Newton, MA (US); Thomas C. Vogel, Miami, FL (US)

(73) Assignee: Google Inc., Mountain View, CA (US)

( * ) Notice: Subject to any disclaimer, the term of this patent is extended or adjusted under 35 U.S.C. 154(b) by 1794 days.

This patent is subject to a terminal disclaimer.

(21) Appl. No.: 10/937,793

(22) Filed: Sep. 9, 2004

(65) Prior Publication Data

US 2006/0053053 A1 Mar. 9, 2006

(51) Int. Cl.
*G06Q 30/00* (2012.01)
(52) U.S. Cl.
USPC .......................................... 705/14.1
(58) Field of Classification Search
USPC .................................... 705/14, 14.1
See application file for complete search history.

(56) References Cited

U.S. PATENT DOCUMENTS

| | | | |
|---|---|---|---|
| 5,331,546 A * | 7/1994 | Webber et al. ............... | 705/6 |
| 5,774,870 A | 6/1998 | Storey | |
| 6,295,521 B1 | 9/2001 | deMarcken et al. | |
| 6,307,572 B1 | 10/2001 | deMarcken et al. | |
| 6,381,578 B1 | 4/2002 | deMarcken et al. | |
| 6,594,640 B1 | 7/2003 | Postrel | |
| 6,801,226 B1 | 10/2004 | Daughtrey | |
| 6,944,652 B1 | 9/2005 | Finch, II et al. | |
| 7,076,446 B1 * | 7/2006 | Kennard ...................... | 705/14 |
| 7,346,526 B2 | 3/2008 | Daughtrey et al. | |
| 2001/0007098 A1 | 7/2001 | Hinrichs et al. | |
| 2001/0037243 A1 | 11/2001 | Rouston et al. | |
| 2002/0111935 A1 | 8/2002 | Jones et al. | |
| 2002/0194068 A1 | 12/2002 | Bishop et al. | |
| 2003/0018500 A1 | 1/2003 | Daughtrey | |
| 2003/0061099 A1 | 3/2003 | Watanabe | |

(Continued)

FOREIGN PATENT DOCUMENTS

| | | |
|---|---|---|
| EP | 1787229 | 5/2007 |
| EP | 1805663 | 7/2007 |

(Continued)

OTHER PUBLICATIONS

Sabre Travel Network Enhances Offering for Fully Automated Fare by Rule Capability to Air Pricing Suite; Global Solution for Category 25 Provides Airlines and Travel Agencies the Ability to Automatically Accept and Process Discounted Fares, PR Newswire, Apr. 6, 2004 (highbeam.com/doc/1G1-114964737.html).*

(Continued)

*Primary Examiner* — Daniel Lastra
(74) *Attorney, Agent, or Firm* — Fish & Richardson P.C.

(57) ABSTRACT

Techniques, for automatically determining frequent traveler award redemptions by rule are disclosed. The frequent travel award redemption program is encoded in rules using predefined data structures based on fare by rule data structures. The techniques automatically determine a travel itinerary based on a query and the rules. Also included is a graphical user interface that displays a plurality of possible travel options for redemption using a frequent travel award. The rules include fields to determine co-pay options and for calculating mileage purchase options.

28 Claims, 11 Drawing Sheets

(56) References Cited

U.S. PATENT DOCUMENTS

| | | | |
|---|---|---|---|
| 2003/0191725 A1* | 10/2003 | Ratliff et al. | 705/400 |
| 2005/0203782 A1* | 9/2005 | Smith | 705/5 |
| 2006/0053052 A1 | 3/2006 | Baggett et al. | |
| 2006/0053053 A1 | 3/2006 | Baggett et al. | |
| 2006/0053055 A1 | 3/2006 | Baggett et al. | |

FOREIGN PATENT DOCUMENTS

| | | |
|---|---|---|
| EP | 1810231 | 7/2007 |
| WO | 2006/029392 | 3/2006 |
| WO | 2006/029409 | 3/2006 |
| WO | 2006/031552 | 3/2006 |

OTHER PUBLICATIONS

Rate Loading: Airlines File Direct W/ATPCo, David Jonas, Business Travel News, Aug. 12, 2002.*

David Jonas, Rate Loading: Airlines File Direct W/ATPCo, Business Travel News, Aug. 12, 2002 (http://www.allbusiness.com/transportation-communications/transportation-services/4153952-1.html).

Joanna Bryant, ATPCO Asia Pacific Regional Conference, "Better with ATPCO" May 5-6, 2009.

ATPCO, ATPCO-Routings, (atpco.net/atpco/products/oir_dc.shtml), retrieved by the USPTO on Jan. 9, 2010.

ATPCO, ATPCO-Glossary R, (atpco.net/atpco/products/glossary_r.shtml), retrieved by the USPTO on Jan. 8, 2010.

Fare by Rule "Better with ATPCO" Asia Pacific Regional Conference, pp. 1-15.

ATPCO-Glossary R, http://www.atpco.net/atpco/products/glossary_r.shtml.

"Rate Loading: Airlines File Direct w/ATPCo", D. Jones, Aug. 12, 2002.

"Data Collection Routing", ATPCO-Routings, http://www.atpco.net/atpco/products/olr_dc.shtml.

"Sabre Travel Network Enhances Offering for Fully Automated Fare by Rule Capability . . . ", Press Release, Jan. 8, 2010, http://www.highbeam.com/doc/IGI-114964737.html, p. 1-3.

Authorized officer Masashi Honda, International Preliminary Report on Patentability in PCT/US2005/032453, mailed Mar. 22, 2007, 9 pages.

Authorized officer Eric W. Stamber, International Search Report and Written Opinion in PCT/US2005/032453, mailed Oct. 3, 2006, 14 pages.

Notice from the European Patent Office dated Oct. 1, 2007 concerning business methods, Official Journal of the European Patent Office, vol. 30, No. 11, Nov. 1, 2007, pp. 592-593.

Authorized officer Michael Bohner, European Search Report in European Patent Office Application No. 05795123.8, mailed Jun. 17, 2009, 6 pages.

Authorized officer Sonia Diaz Calvo, European Search Report in European Patent Office Application No. 05793384.8, mailed Jul. 15, 2009, 4 pages.

Authorized officer Philippe Becamel, International Preliminary Report on Patentability in PCT/US2005/032394, mailed Mar. 22, 2007, 6 pages.

Authorized officer Blaine R. Copenheaver, International Search Report and Written Opinion in PCT/US2005/032394, mailed Apr. 24, 2006, 10 pages.

Authorized officer Wolfgang Konig, European Search Report in European Patent Office Application No. 05796175.7, mailed Mar. 25, 2008, 5 pages.

Authorized officer Nora Lindner, International Preliminary Report on Patentability in PCT/US2005/032535, mailed Mar. 22, 2007, 8 pages.

Authorized officer Eric W. Stamber, International Search Report and Written Opinion in PCT/US2005/32535, mailed Oct. 19, 2006, 12 pages.

"Galileo Continues Its Lead in Faring Automation", [online] [Retrieved on Sep. 21, 2011]; Retrieved from the Internet URL: http://www.galileo.com/NR/rdonlyres/70B735D8-0F56-401C-9673-81B84ECC3E1E/0/Cat25GalileoPosition.pdf.

Authorized officer Rodolphe Bauer, Supplementary European Search Report, mailed Jul. 22, 2011 for European Patent Office Application No. 05795657.5-2221, 5 pages.

Authorized officer Beate Giffo-Schmitt, International Preliminary Report on Patentability in PCT/US2005/031804, mailed Mar. 22, 2007, 8 pages.

Authorized officer Eric W. Stamber, International Search Report and Written Opinion in PCT/US2005/031804, mailed Oct. 24, 2006, 12 pages.

* cited by examiner

CO-PAY OPTIONS FOR FREQUENT TRAVELER AWARD REDEMPTION BY RULE

RESERVATION OF COPYRIGHTS

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Independent travel service sellers (e.g., Orbitz, Inc., Expedia, Inc.) are travel service sellers that are not related to only one travel service provider. Since they are not related to only one travel service provider, they can generate travel options from many different travel service providers, giving a customer a broader selection of choices. Travel options include itineraries (e.g., a sequence of one or more legs of travel (e.g., flights)) for which a fare can be generated. Independent travel service sellers generally, use automated systems, accessible over the Internet, to determine travel options by applying fares to scheduling information such as flights, routes, itineraries and so forth. Application of fares to scheduling information involves use of certain rules. These rules are used to determine, for example, whether a fare can be used for a particular passenger itinerary. One example of such rules in the airline industry are those published by the Airline Tariff Publishing Company (ATPCO). To accommodate automated systems, ATPCO developed data structures for use with such automated systems to determine applicability of fares to schedule information using the rules. ATPCO defines these data structures so that travel providers (e.g., airlines) can define their rules for their fares using predefined fields and values of the ATPCO data structures.

To compete for business and to try to retain travelers, travel providers (e.g., airlines, bus companies, rail companies) have developed frequent traveler programs where the traveler receives some award credit (e.g., miles) for travel with a particular travel provider. These frequent travel programs allow the traveler to redeem this award credit for free tickets, upgrades, and other services. In some cases, travel providers have partnered with one or more other travel providers to increase the benefits of the frequent traveler programs by allowing both award credit and/or redemption to be given by the partners. Typically, to redeem the award credit that a traveler has accumulated, the traveler calls a customer service representative of the travel provider. Internet travel service sellers do not automatically calculate travel availability for redemption of accumulated award credit in frequent traveler programs.

SUMMARY OF THE INVENTION

According to an aspect of the invention, a method executed in a computer-based network includes receiving rules for frequent travel award redemption programs, with the rules encoded in predefined data structures including fields to indicate a first fare and a second fare and automatically calculating a cost for a travel itinerary based on the rules and values associated with the first fare and the second fare fields, with the cost comprising a first component expressed as an award credit and a second component expressed in a currency.

According to an additional aspect of the present invention a system includes a computing device adapted to receive rules for frequent travel award redemption programs, with the rules encoded in predefined data structures including fields to indicate a first fare and a second fare; and automatically calculate a cost for a travel itinerary based on the rules and values associated with the first fare and the second fare fields, with the cost comprises a first component expressed as an award credit and a second component expressed in a currency.

According to a further aspect of the present invention, a computer program product is tangibly embodied in a computer readable medium. The computer program product includes instructions operable to cause data processing apparatus to receive rules for frequent travel award redemption programs, with the rules encoded in predefined data structures including fields to indicate a first fare and a second fare and automatically calculate a cost for a travel itinerary based on the rules and values associated with the first fare and the second fare fields, with the cost comprises a first component expressed as an award credit and a second component expressed in a currency.

Implementations can include one or more of the following features. The fields to indicate the mileage credit include a specified fare field and a currency field. The predefined data structures comprise a category 25 record 3 ATPCO data structure value for the currency field indicates the fare is associated with a co-payment in addition to an award credit. The fare calculation indicator indicates that the co-payment in the second currency field is in addition to the award credit.

One or more of the following advantages may be provided by one or more aspects of the invention.

The frequent traveler award redemption process can accommodate frequent flyer programs that include a co-payment. For Frequent Flyer Award Redemption fare fields are used to express the earned mileage required to obtain the award, and additional co-pay amounts. Each fare field specifies a fare amount, currency, and decimal place(s) in the amount. One fare field can be used for earned mileage, and the other fare field can be used for co-payments. As such, the relationship between the fields is an "And" relationship, thus encoding award that requires both the redemption of miles and a co-payment.

The details of one or more implementations are set forth in the accompanying drawings and the description below. Further features, aspects, and advantages of the invention will become apparent from the description, the drawings, and the claims.

BRIEF DESCRIPTION OF THE DRAWINGS

FIGS. 5 and 6 are example screenshots displaying frequent traveler award redemptions.

DETAILED DESCRIPTION

Figure 1:
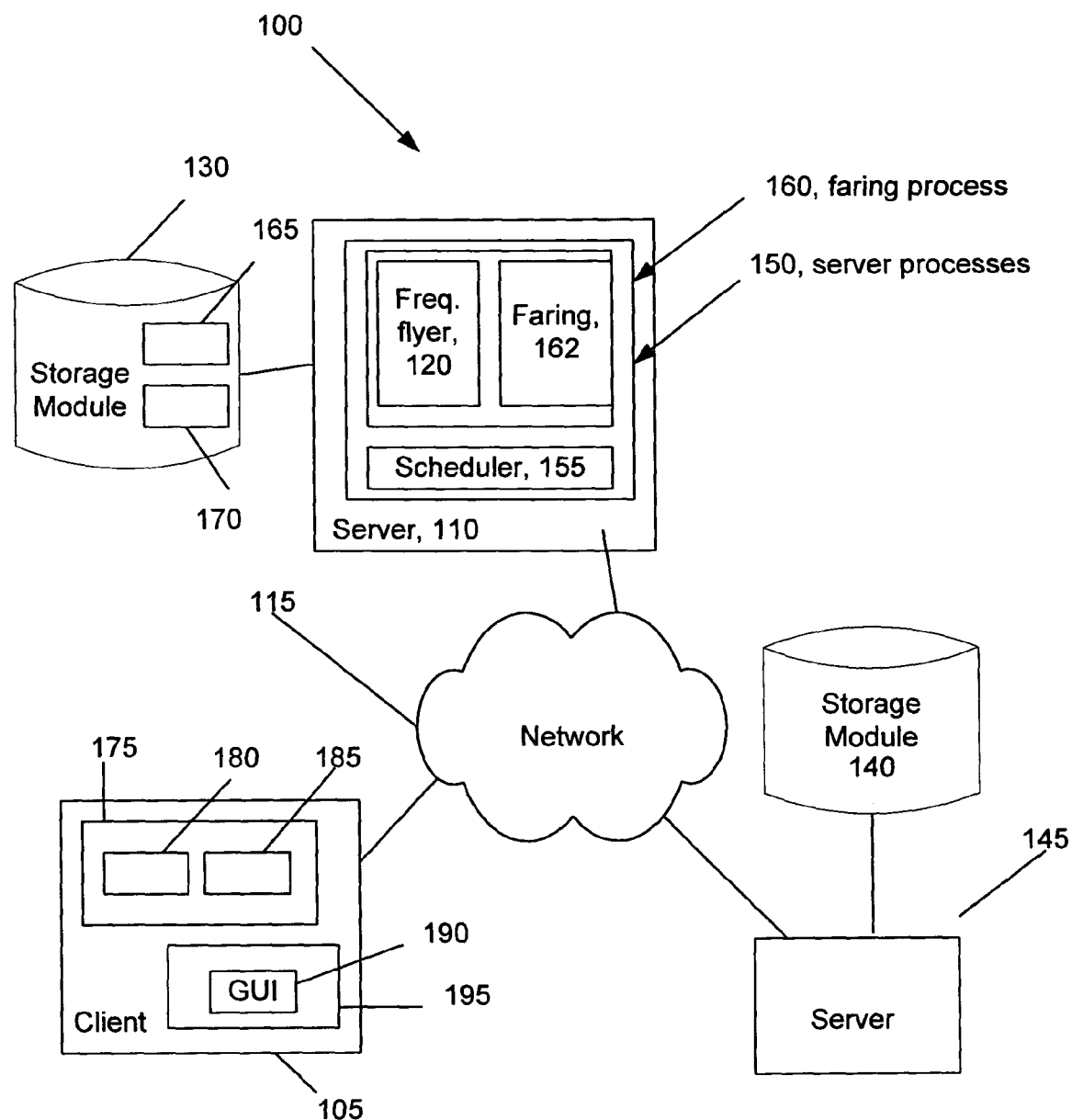
FIG. 1 is a block diagram of a travel planning system used to determine frequent traveler award redemptions by rule.

Referring to FIG. 1, in general overview a travel planning system 100 includes a client 105 (e.g., personal computer) in communication with a server 110 using a network 115, such as the Internet or a private network. The travel planning system 100 can be used with various forms of travel such as airline, bus, railroad, and the like. For illustrative purposes, the examples described below are particularly suited for air travel. The server 110 can be administered by, for example, an independent travel service seller. The server 110 includes a frequent traveler award redemption process 120 for determining frequent traveler award redemptions using one or more rules. The frequent traveler award redemption process 120 is executed for example, using a process stored in a computer memory, and which resides on a storage system or device 130 of server 110. A user, employing client 105, sends a query to the frequent traveler award redemption process 120. The query includes a request for the frequent traveler award redemption process 120 to determine whether particular travel arrangements (e.g., departure location, arrival location, day, time, class, etc.) are possible for redemption of accumulated award credit (e.g., miles) in a given carrier's Frequent Traveler program via one or more participating carriers.

As described in more detail below, the frequent traveler award redemption process 120 uses the data in the query, along with data corresponding to one or more rules of a carrier's frequent traveler program to determine what travel arrangements are possible. The rules include the requirements and the restrictions of the program, as established by an owning carrier. For example, the rules can include geographic limitations of the program, distance restrictions, other participating carriers, scheduling restrictions, distance restrictions, and the like. The rules also include fare data so that process 120 can read and compare with query data to determine whether there are any matches, as described in more detail below, and determine the awards (also referred to as fares) of those matching travel options. The rules are defined using predefined data structures. The frequent traveler award redemption process 120 can obtain the rules from its storage module 130 and/or from a third party's database stored on a storage module 140, which is in communication with the network 115 through a server 145.

When the frequent traveler award redemption process 120 determines what travel arrangements are possible, the frequent traveler award redemption process 120 sends this information to the client 105 to be displayed to the user in various formats, examples of which are described in more detail below.

For determining possible travel arrangements, server 110 includes a plurality of server processes 150. The plurality of server processes 150 includes a scheduler process 155 and faring processes 160. The scheduler process 155 is any suitable scheduler process that produces/generates, from a travel request, sets of flights that can satisfy the request. The faring process 160 is a process that determines a set of valid fares and links the set of valid fares to the sets of flights to form a pricing solution. The faring process 160 includes the frequent travel award redemption process described above, determines fares for possible travel arrangements in terms of redemption of earned travel award credit (e.g., frequent flyer miles) in exchange for free or reduced cost travel and can also include a convention faring process 162. The plurality of server processes 150 can be configured to produce other travel-related information as a result of a user query. For example, the plurality of server processes 150 can produce routes or airline suggestions, optimal travel times and suggestions for alternative requests.

The travel planning system 100 also includes a plurality of databases 165 and 170, which store industry-standard information pertaining to travel (e.g., airline, bus, railroad, etc.).

For example, database 165 can store the Airline Tariff Publishing Company database of published airline fares and their associated rules, routings and other provisions, the so-called ATPCO database. As another example, database 165 can store the SITA AIRFARE (SITA Inc. Geneva Switzerland) database, which also contains fare information. Other databases that represent faring information in data structures can be used. Database 170 can be an inventory of current availability of airline information for a particular carrier and so forth. The databases 165 and 170 can be stored locally and updated periodically by accessing remote resources, such as 140 and 145 that maintain the respective databases.

The client 105 can be a smart client. That is, client 105 can include a client computer system that has a computer memory or storage media 175 that stores a client process 180 and a set of pricing solutions 185. The set of pricing solutions 185 in one embodiment is provided from the server process 150 and comprises a set of fares, typically represented as earned award credit (e.g., frequent flyer miles), that are valid for a journey, and associated information linking the fares to the flight segments of the journey. Although the fares are typically represented as earned award credit, the fares can also include a monetary component (e.g., represented as currency, such as U.S. dollars). As explained in more detail below, the monetary component can be required as a "co-payment" with the award credit, or can be used to purchase a portion of the needed award credit (e.g., money needed to purchase 5,000 miles for a 15,000 mile award redemption).

The set of pricing solutions 185 is obtained from the server 110 in response to a user request sent from the client 105 to the server 110. The server 110 executes the plurality of server processes 150, using the scheduling process 155 and the faring process 160 to produce a set of pricing solutions for a particular journey. Under control of the client process 180, the requesting client 105 can store and/or logically manipulate the set of pricing solutions 185 to extract or display a subset of the set of pricing solutions 185 as a display representation 190 (e.g., a graphical user interface (GUI)) on a client display 195. The server processes 150 are preferably executed on the server computer 110, but can be executed on the client computer 105.

Figure 2:
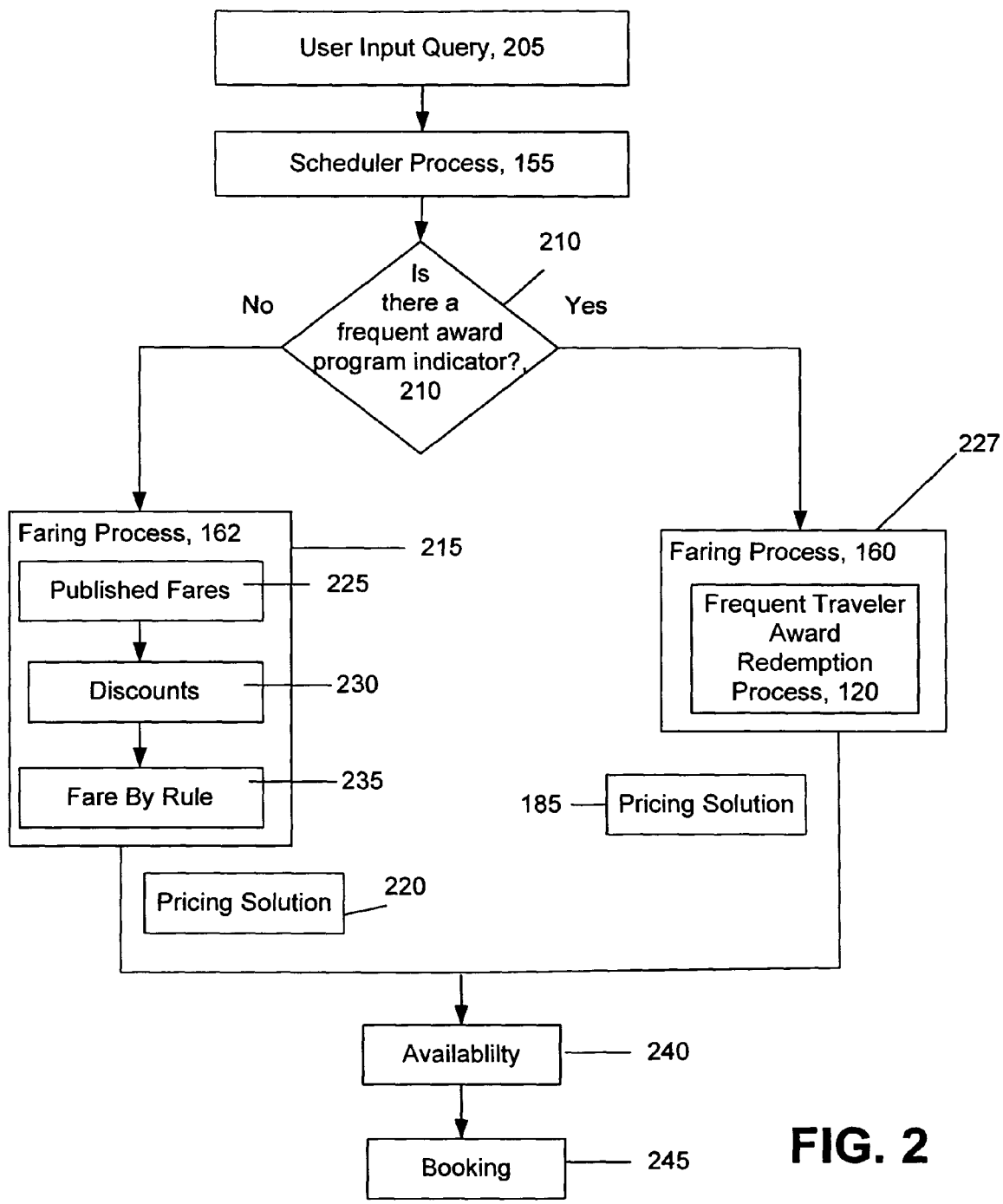
FIGS. 2, 3, 4A and 4B are flow charts of processes to determine and display frequent traveler award redemptions by rule.

Referring now to FIG. 2, the server processes 150 (e.g., faring process 155 and scheduling process 160) are responsive to a user input query 205. The user input query 205 typically includes minimal information needed to determine a set of pricing solutions. This information can include, for example, an origin and a destination for travel. In addition, the information can also include times, dates and so forth. Examples of a user input query 205 are described below.

In one implementation, this query 205 is fed to the scheduler process 155 that produces a large number of itineraries, that is, sequences of flight segments between the origin and destination for each slice of a journey. Examples of scheduler systems that may be used include the OAG Flight Desk (Official Airlines Guide, a division of Reed Travel Group) or schedule components of computer reservation systems (CRS's) such as Sabre®, Apollo®, Amadeus® and World-Span®. It is preferable in order to obtain the largest number of possible itineraries to use a scheduler with dynamic connection generation. Such a scheduler is described in U.S. patent number, entitled SCHEDULER SYSTEM FOR TRAVEL PLANNING SYSTEM, Ser. No. 09/109,622, filed on Jul. 2, 1998 by Carl G. de Marcken et al., pending and assigned to the assignee of the invention and incorporated herein by reference.

The scheduler process 155 provides the itineraries to one a faring process component 120 or a faring process component 162 of the faring processes 160. To determine which faring process is used, the server processes 150 determines 210 whether there is a frequent award indicator. As described in more detail below, the server processes 150 can use, for example, an account code value to determine whether the query is associated with a frequent award program.

If there is no indication that the query relates to a frequent award program, then server 110 executes 215 a faring process 162 for determination of traditional, monetary-based fares. The faring process 162 provides a set of pricing solutions 220 by finding valid fares corresponding to the itineraries produced by the scheduler process 155. The faring process 215 validates the fares for inclusion in the set of pricing solutions 220. In general overview, the faring process 215 includes three processes 225, 230, and 235. The process 225 searches for published fares. The process 230 searches for discounts. The process 235 searches for further calculations and/or adjustments to fares using rules, such as the fare by rule process using the ATPCO database or SITA AIRFARE (e.g., database 165) described above. Such a faring process 215 is described in more detail in U.S. Pat. No. 6,295,521, entitled TRAVEL PLANNING SYSTEM, Ser. No. 09/109,327, filed on Jul. 2, 1998 by Carl G. de Marcken et al., assigned to the assignee of the invention and incorporated herein by reference. Other examples of faring processes could be used for the fare by rule faring process 162

However, if there is an indication that the query relates to a frequent award program, then server 110 executes 227 the faring process 160, which includes process 120 for determination of fares based on award credit while bypassing process 225 and 230, and incorporating certain elements of process 235 Fare By Rule. The faring process 160 provides a set of pricing solutions 185 by finding valid fares corresponding to the itineraries produced by the scheduler process 155 using a set of encoded rules, as described in more detail below.

The set of pricing solutions (e.g., 185 or 220) is used by an availability process 240 that interrogates an airline inventory database (e.g., 170), to determine whether there are seats available on particular flights for particular pricing solutions. The availability process 240 uses the airline inventory database as a filter to remove from the set of pricing solutions those pricing solutions for which there are not available seats. The availability process 240 is shown after the faring process (e.g., 160 or 215). However, availability process 240 can be included at nearly any point in the process illustrated in FIG. 2. In addition, the availability process 240 is shown being fed by the pricing solution when it may only receive flight information from the scheduler process 155, depending on the airline.

The client system 105 receives the results from one or more of the server processes 150 (e.g., 155, 160, 215, and/or 240). These results can be used to form the set of pricing solutions 185 and/or pricing solutions based upon availability. The client process 180 executed in the client 105 uses this information or a subset of it to access a booking process 245 to provide booking and a reservation for a user-selected travel option included in the pricing solutions 185. For example, the client system 105 can receive data from process 155 and process 160 and combine them to generate the pricing solution 185, or the client 105 can receive the pricing solution 185 from the faring process 160, or the client 105 can receive the pricing solution 185 after the availability process 240.

The client process 180 (FIG. 1) receives a listing of possible itineraries from the scheduler process 155 as well as the set of fares from the faring process 160 or the availability system 240. The set of pricing solutions 185, if obtained from the faring process 160, will include a large number of pricing solutions for which there is not any available inventory. Therefore, in that example, the component flights are first checked with an airline prior to the booking process 245. The set of pricing solutions 185 if obtained after the availability system 240 should contain pricing solutions that have a high degree of availability for booking on an airline.

Figure 3:
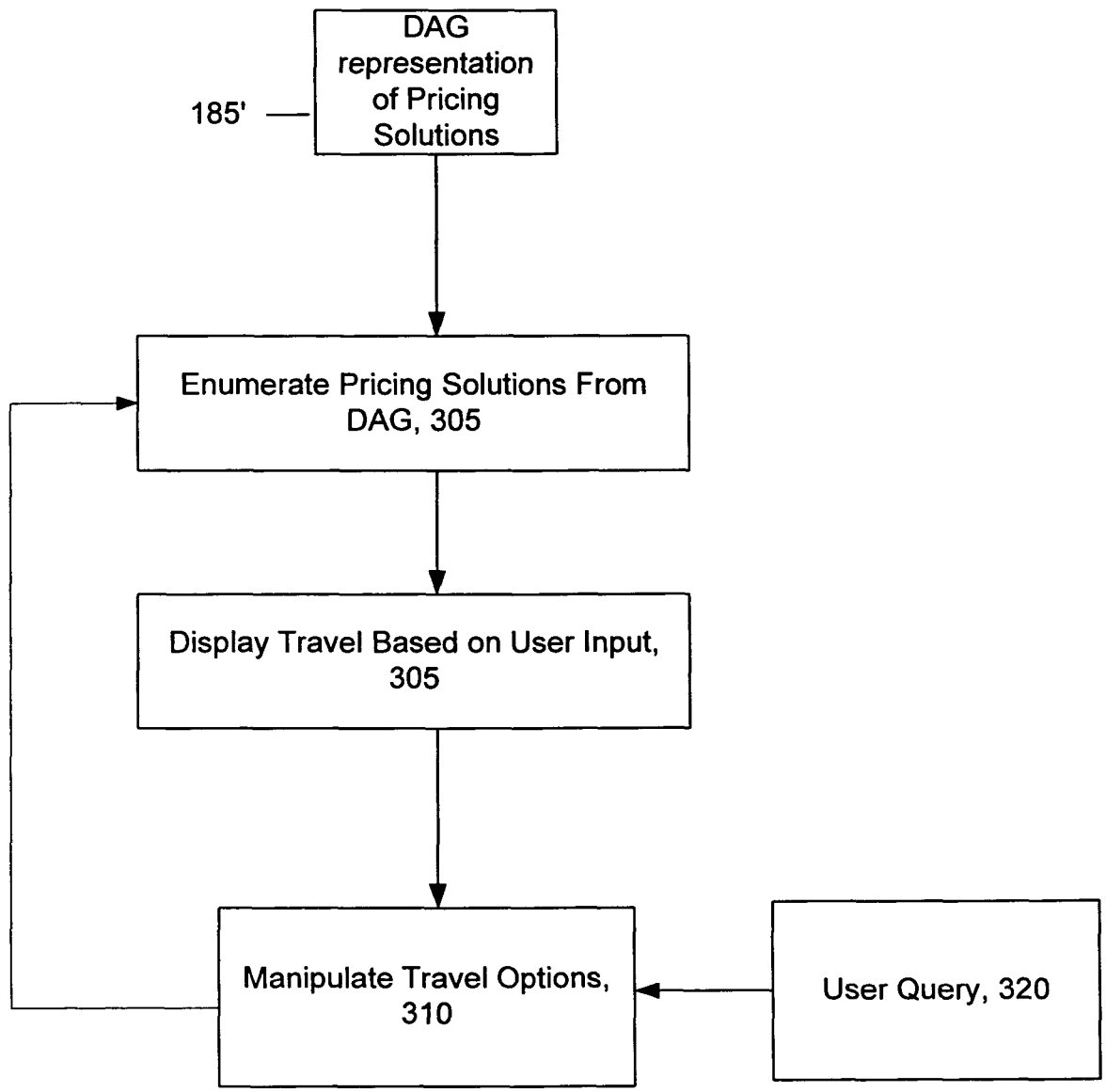

Referring now to FIG. 3, in one embodiment, the set of pricing solutions 185 is provided in a compact representation 185'. A preferred, compact representation 185' of the set of pricing solutions 185 is as a data structure comprising a plurality of nodes including itineraries and fares and that can be logically manipulated using value functions to enumerate 305 a set of pricing solutions. One preferred example is a graph type data structure, particularly a directed acyclic graph (DAG) that contains nodes that can be logically manipulated 310 or combined to extract a plurality of pricing solutions for display 315.

In one example, the client process 180 receives the flight information from scheduler process 155 and the pricing solution from the faring process 160 or the availability system 240 and enumerates 305 pricing solutions from the directed acyclic graph (DAG) representation 185. The enumerated set (e.g., from process 305) of pricing solutions is rendered or displayed 315 in a graphical user interface 190 on the client monitor 195 (FIG. 1) in a manner as will be described below.

In response to user input 320, the client 105 can manipulate 310 travel options and can query the local copy of the DAG to produce and display a subset of pricing solutions enumerated from the DAG that satisfy the query 320. An example manipulation process used to control the display and change the travel options displayed will be described below.

In this example, a directed acyclic graph (DAG) is used to represent the compact set of pricing solutions 185' since, in general, the number of nodes needed to represent a typical pricing solution will be substantially less than the actual number of pricing solutions represented by the DAG. This significantly increases the efficiency of transfer of a set of pricing solutions 185 from one of the server processes 150 to the client process 180. The DAG representation also minimizes the storage requirements for the set of pricing solutions 185. The DAG representation permits the use of powerful search, sorting, and manipulation processes to produce various pricing solutions in an efficient manner. As used herein, a directed acyclic graph (DAG) is a set of nodes connected by directed arcs that have no loops of arcs in the same direction. If a node A is connected to a node B via an arc A-B, then A is called a parent of B, and B is called a child of A. Each node may have zero, one or many parents and zero, one or many children. As used herein, a pricing solution that is represented by a graph will be referred to as a pricing graph. Such a pricing graph is described in more detail in U.S. Pat. No. 6,295,521, entitled TRAVEL PLANNING SYSTEM, Ser. No. 09/109,327, filed on Jul. 2, 1998 by Carl G. de Marcken et al., assigned to the assignee of the invention and incorporated herein by reference. When the pricing solution 185 is generated using faring process 160, the fares represented in the pricing graph includes earned travel credit requirements, as determined as described in more detail below.

Figure 4A:
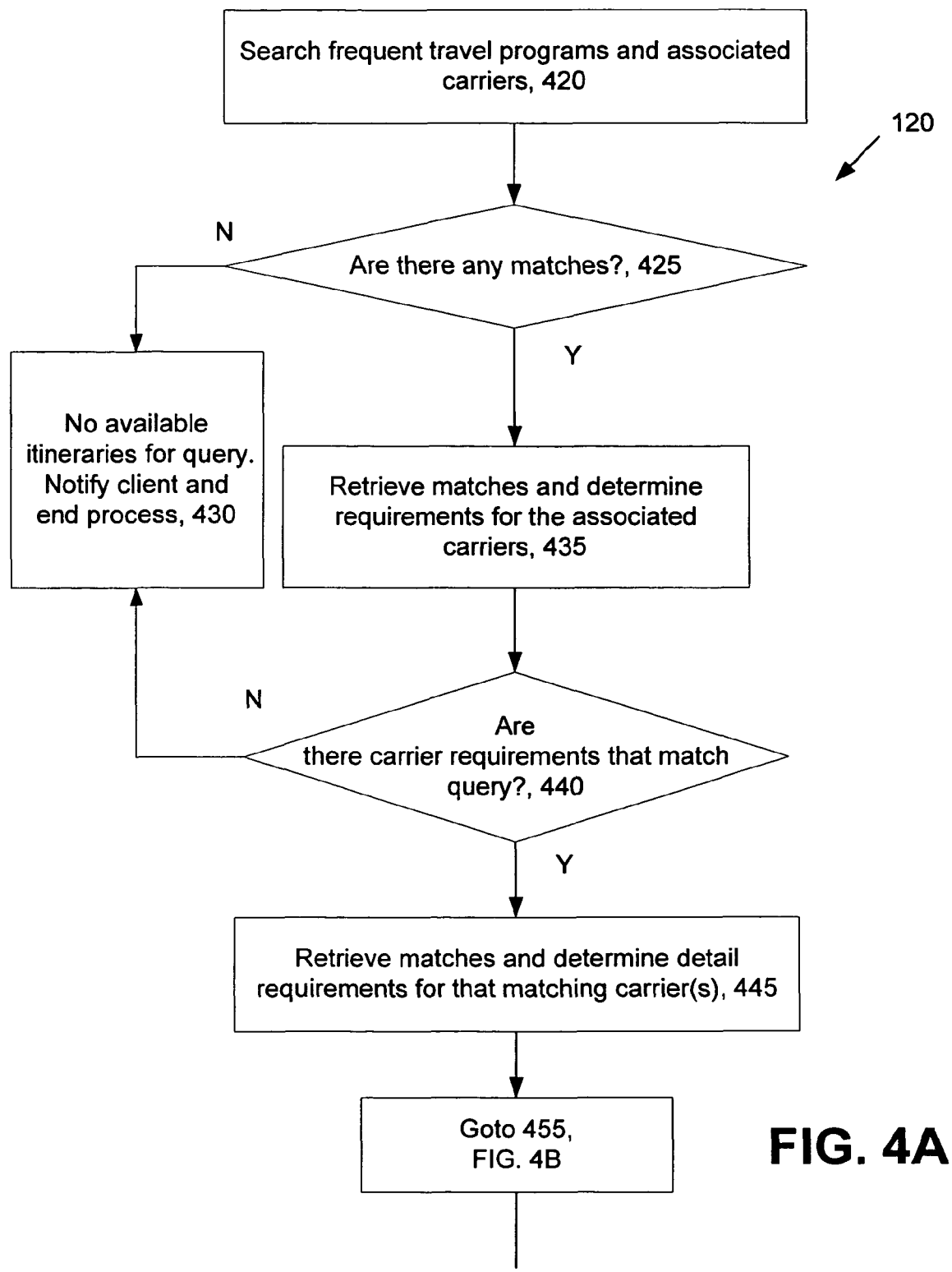
Figure 4B:
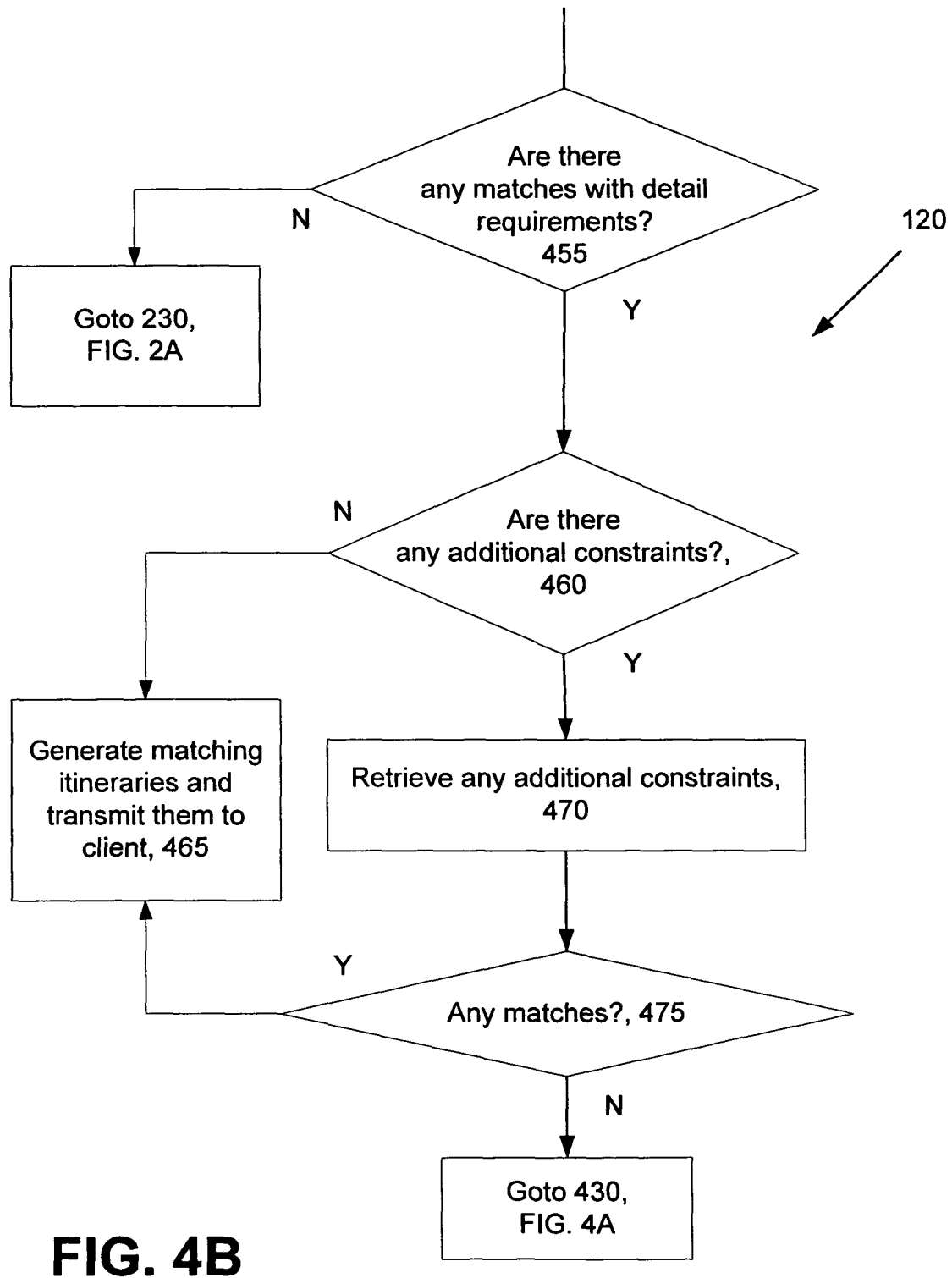

FIGS. 4A and 4B (discussed below) illustrate an example of the frequent traveler award redemption process 120 to determine frequent traveler award redemptions by rule. As described above, the Airline Tariff Publishing Company (ATPCO) has developed data structures for use by automated systems determining airline fares using ATPCO rules (also referred to as Fare By Rule (FBR)). The frequent traveler award redemption process 120 uses the ATPCO "fare by rule" data structures in a different way, or uses modified field and values, as described in more detail below, to determine fares represented in terms of travel award credit. Some of the ATPCO fields and values are used in a new or different way than current fare by rule process to calculate fares in terms of travel award credit. Other fields and values are modified, because the ATPCO encoding was developed for revenue travel, not reward travel. Using modified ATPCO data structures advantageously allows systems that currently use the fare by rule mechanism offered by ATPCO's industry standard fare (e.g., process 215) and rule encoding, to be adapted to determine frequent traveler award redemptions by rule (e.g., process 120). Also, frequent flyer award redemption fare by rules typically entail specified amounts expressed in earned travel credit (e.g., miles), but there are also those awards that include percentage discounts off of published fares upon payment of a specified amount of earned award credit. In such cases, using modified ATPCO data structures and the fare by rule processing mechanism enables rules data from the published base fare to be used as well, in fare by rule processing logic.

The modified ATPCO data structures used in frequent traveler award redemption process 120 include:

Record 8's: Record 8's are carrier-specific records that include eligible frequent flyer passenger information, along with fields and tables that provide a list of other participating (partner) carriers and geographic data outlining scope of a particular award program (or multiple programs). Information from an in-coming query is matched against data in the Record 8s to find award programs that may apply to a passenger corresponding to the incoming query.

Category 25: While Record 8's indicate the tariff/carrier/rule associated with a particular award program or set of programs, if a particular passenger's itinerary/query meets the criteria in the Record 8's, then the system continues to the tariff/carrier/rule referenced for each Record 8 that "matches." Within such a tariff/carrier/rule, among the rule categories coded, there is a Fare By Rule Category 25. In the examples set out below, the processing of Category 25 data structures (e.g., Record 2's and Record 3's) is where the award redemption is determined and produced.

Record 2's: Specifically, each Category 25 will include one or more Record 2 sequences. Within an award program(s) covered by a particular rule, if there are unique provisions applicable to a particular participating carrier, or region, sub-region, or market, a unique Record 2 sequence is produced. If provisions are the same for all participating carriers and markets, there will be just one Record 2 sequence. And once again, the query will match to the applicable sequence.

Record 3's: The actual award redemption details are included in Record 3 tables. These Record 3's are attached to the Record 2 sequence in a string of up to 200 tables. Within each Category 25 Record 3, more matching fields are provided covering booking codes, number of flight segments, mileage ranges, fare type/cabin information, and other criteria that distinguish one award from another and match to the information in the query. The Category 25 Record 3 also includes award fields that provide the award code, earned mileage redemption requirements and other details of the award. Separate Record 3 tables will be used to produce separate awards. The system will attempt to produce a frequent flyer award redemption for every matching Record 3, and subsequently can potentially return multiple award possibilities to chose from.

Other Categories: In addition to Category 25, the other automated rules categories, within the frequent flyer rule can be used to code the provisions and restrictions governing the frequent flyer award redemption produced in the Category 25 Record 3's. For example, advance reservation requirements associated with many awards (such as American Airline's "MileSAAvers$^{SM}$"awards) can be coded in Category 5—Advance Reservations and Ticketing. Blackout dates associated with certain awards (such as Alaska Airline's (AS's) "Saver" awards) can be coded in Category 11—Blackouts, while the peak and off-peak travel dates, such as those applicable to certain seasonal destinations, can be coded in Category 3—Seasonality. Various types of award redemption service charges could be handled in Category 12—surcharges. Flight restrictions, stopovers, transfers, etc. are coded in their appropriate categories.

As described in connection with FIG. 2, server 110 receives (205) a query from the client 105. Table 1 below illustrates an example of the data that can be included in the query.

TABLE 1

| Data Type | Query Value |
| --- | --- |
| DEPARTURE DATE/TIME | Mar. 28, 2004 |
| ORIGIN DEPARTURE | PDX |
| DESTINATION | LAS |
| CONTINUING DATE/TIME | Apr. 05, 2004 |
| CONTINUING DEPARTURE | LAS |
| FINAL DESTINATION | PDX |
| CARRIER(S) | AS |
| CABIN | COACH |
| PASSENGER TYPE | FFY |
| SALES CARRIER | AS |
| ACCOUNT CODE | FFYAR |

Using this query, frequent traveler award redemption process 120 determines (210) whether there is a frequent award program indicator. For example, using the data in Table 1, frequent traveler award redemption process 120 uses the account code value to determine whether the query is associated with a frequent award program. If the value "FFYAR" does not indicate a frequent award program, the server 110 employs another process to determine fares by rule (e.g., process 215), instead of the frequent travel award redemption process 120. If the value "FFYAR" does indicate a frequent award program, the server 110 employs the faring process 160 to determine the travel options and fares (in terms of earned award credit) available under the program.

Referring to FIGS. 4A and 4B, the frequent traveler award redemption process 120 processes the query by retrieving (420) frequent travel programs and associated carriers using the frequent award program data structures in the fare database (e.g., 165, which can be the ATPCO database). Published fares are not interrogated, since this is a frequent travel award redemption. Instead, frequent traveler award redemption process 120 interrogates the Record 8 data structures to identify matches between the received query data and the stored record 8's. Frequent traveler award redemption process 120 matches (425) as many Record 8s as possible, including those of partner carriers identified in the Record 8 joint carrier table 997 ("Partner Table"). Using the joint carrier table 997, process 120 checks all flights meeting the query criteria (e.g., the results of the scheduler process 155) to find all applicable flights via carriers participating in the mileage plan program. (Or specific flights may be requested in the query.) If there are no matches, the frequent traveler award redemption process 120 notifies (430) the client 105 that no itineraries matching the query data exist. If there are one or more matches, the frequent traveler award redemption process 120 retrieves (435) the matches.

One example match is shown below in Table 2. The match is to an example rule that can be added to hold coach awards. It should be noted that Table 2 does not include all of the fields in an ATPCO Record 8, but in general only those fields that have been modified to accommodate a frequent traveler redemption award by rule for this example. A more complete ATPCO Record 8 is described later.

aries of the frequent travel award program represented by that Record 8. The loc 1 and loc 2 fields represent the geographic scope of the origination location and the destination location. In the case of the example query data in Table 1, the origination airport in the query is PDX, Portland, Oreg. PDX is part of the contiguous 48 states and therefore is a match to zone 001. Similarly, the destination airport in the query is LAS, Las Vegas, Nev., which is also part of the contiguous 48 states and therefore is a match to zone 001.

Continuing with the frequent traveler award redemption process 120, the frequent traveler award redemption process

TABLE 2

| Record 8 Field | Query Match/Action | Coding |
| --- | --- | --- |
| CXR CODE | Match:<br>SALES CARRIER AS<br>Action:<br>(proceed to the AS tariff and rule indicated below) | AS |
| PRIME PASSENGER TYPE CODE | Match:<br>PASSENGER TYPE FFY | FFY |
| QUALIFYING ACCOUNT CODE | Match:<br>ACCOUNT CODE FFYAR | FFYAR (Frequent Flyer Award Redemption) |
| TARIFF NUMBER | Action<br>(proceed to tariff FBRNAPV) | FBRNAPV - 191<br>Within/between US/CA, between US/CA - PR/VI,<br>Within PR/VI. |
| RULE NO | Action<br>(proceed to Rule 1234) | 1234 |
| JOINT CARRIER TABLE 997<br>(Partner Carrier Table) | Match:<br>CARRIER<br>AS $ | The Joint Carrier Table can list AS and other partner carriers, such as NW and QX, or reference all partners with a generic "$". (Category 4 can hold more detailed partner information) |
| GEO SCOPE: | | |
| LOC 1<br>Or User Defined Zone Table 978 | Match:<br>ORIGIN DEPARTURE<br>PDX | Z: 001<br>(Contiguous 48 states)<br>Z: 002<br>(Canada)<br>Z: 008<br>(Alaska) |
| LOC 2<br>Or User Defined Zone Table 978 | Match:<br>FINAL DESTINATION<br>LAS | Z: 001<br>(Contiguous 48 states)<br>Z: 002<br>(Canada)<br>Z: 008<br>(Alaska) |

With the above information, frequent traveler award redemption process 120 can determine that there is a frequent flyer award redemption that the passenger may qualify for, using a process similar to the ATPCO fare by rule process. In the Record 8 data structure, the CXR code field identifies the carrier to which the record applies. This refers to the carrier filing a particular frequent flyer award redemption program. The carrier code here matches to the sales carrier/address identified in the incoming query example in Table 1 (AS). The prime passenger type code identifies the passenger type, such as FFY, a frequent flyer passenger. Other types might be defined according to different service levels associated with a program, such as those for silver, gold, and platinum type passengers.

The qualifying account code field lists the account to identify that the query is for a frequent travel award redemption. The tariff number field and the rule number field are used to match with Record 2s, as described below. The joint carrier table 997 is used to list carriers that participate in this travel award program. If there is not a joint carrier table for a particular Record 8, the frequent traveler award redemption process 120 can default to the sales carrier AS. The location fields of the geographic scope indicate the geographic bound- 120 retrieves (435) matches, e.g., the Record 8s, and determines (435) the special requirements for the associated carriers in the matched Record 8s. To determine if the passenger is eligible (e.g., matches the special requirements), the frequent traveler award redemption process 120 uses the appropriate tariff/carrier/rule information (also referred to as TRF/CXR/RUL) indicated in the Record 8 above, in the tariff number field, the CXR code field, and the rule number field, respectively. Frequent traveler award redemption process 120 compares the tariff/carrier/rule information to ATPCO CATEGORY 25, Record 2s to determine (440) whether there are any matches. If there are no matches, the frequent traveler award redemption process 120 notifies (430) the client 105 that no itineraries matching the query data exist. If there are one or more matches, the frequent traveler award redemption process 120 retrieves (445) the matches.

One example match of a Category 25, Record 2 is shown below in Table 3. It should be noted that Table 3 does not include all of the fields in an ATPCO Category 25, Record 2, but in general only those fields that have been modified to accommodate a frequent traveler redemption award by rule for this example. A more complete ATPCO Category 25, Record 2 is described later.

TABLE 3

| Category 25 Record 2 Field | Match/Action | Coding |
|---|---|---|
| Rule Tariff | Match to the Rule Tariff in the Record 8 | 191 (FBRNAPV) |
| Carrier Code | Match to the Carrier Code on the Record 8. | AS |
| Rule No | Match to the Rule Number on the Record 8. | 1234 |
| Sequence No | Action | 9000000 |
| Loc 1 Type | Match | Z (zone) |
| Loc 1 Geo Spec | Match the Area/Zone/Nation/State/City to a point in the query market filtered through Record 8. | 001 (The 48 contiguous United States and the District of Columbia) |
| Loc 2 Type | Match | Z (zone) |
| Lac 2 Geo Spec | Match the Area/Zone/Nation/State/City to a point in the query market filtered through Record 8. | 001 |
| JT CXR Table 997 | Match | (A table number pointing to a table coded as follows) AS QX |
| Effective Date | Match | 030804 |
| Discontinue Date | Match | 9999999 |
| Relational Indicator | Action | THEN |
| Cat No | Action | '25'. |
| Record 3 Table No | Action | 3456543 |

In Table 3, the rule tariff field, the carrier code field, and the rule number field are the matching values to the tariff number field, the carrier code field, and the rule number field in the Record 8. The sequence number determines the order in which matching the Record 2 is attempted. The loc 1 type and loc 2 type indicate the type of geographic specification (e.g., area, zone, country, state, or city). In Table 3, the location types are zones. The loc 1 geo spec field and the loc 2 geo spec field indicate the specific geographic limitations. In Table 3, the query data falls within the geographic limitation of zone 1, the 48 contiguous states. The JT CXR table 997 points to the table that includes a listing of all of the partner carriers. The effective date lists the first date on which the Record 2 is effective. The discontinue date lists the last date on which the Record 2 is effective. The relational indicator field indicates the relationship between multiple Record 3 tables. If only one Record 3 table exists, the Relational Indicator is "THEN." However, often there will be separate Record 3 tables, each pertaining to a particular award code. In such cases, the additional Record 3 tables will be strung together with an "OR" Relational Indicator. On occasion, an award covered in a particular Record 3 Table is conditional upon criteria in another category. The Record 3 for the other category is preceded by a Relational Indicator of "IF". Often such strings of Record 3 tables end with an "ELSE" Relational Indicator signifying the end of the string and containing conditions for all other matching data.

The cat no field indicates the category number of the data structure, in this case category 25.

The Record 3 table no field identifies any Record 3 tables that match (455) the detail requirements for a particular carrier for a particular frequent travel award program within the Record 2 sequence. Table 4 provides an example Record 3 table. Table 4 does not include all of the fields in an ATPCO Category 25, Record 3, but in general only those fields that have been modified to accommodate a frequent traveler redemption award by rule for this example. A more complete ATPCO Category 25, Record 3 is described later.

TABLE 4

| Category 25 Record 3 Fields | Match/Action | Definition/Processing |
|---|---|---|
| TABLE NO | Key Match | 3456543 |
| PASSENGER TYPE | Match | FFY |
| NUMBER OF FLIGHT SEGMENTS | Match | 99 (unlimited) |
| FARE CALCULATION FORMULA INDICATOR | Action | S (Specified) |
| SPECIFIED FARE NO. 1 | Action | 20000 (earned miles) |
| CURRENCY 1 | Action | MLG ("miles" or similar coding convention to indicate miles instead of a currency amount) |
| DECIMAL | Action | 0 |
| RESULTING FARE INFORMATION | | |
| OW/RT | Match/Action | 2 (Round-Trip) |
| ROUTING TARIFF | Action | 099 (DRG1) |
| ROUTING NUMBER | Action | 051 |
| FARE CLASS | Action | ASY1 (Coach SAVER within the Continental U.S. & Canada) |

TABLE 4-continued

| Category 25 Record 3 Fields | Match/Action | Definition/Processing |
|---|---|---|
| FARE TYPE | Match/Action | EAR (Economy Class/Cabin Award Redemption) |
| PRIME RBD | Action | T |
| TICKET DESIGNATOR | Action | FFAR |

In Table 4, the table no field identifies the table number of the Record 3 table and is a matching value to Record 3 table no field in the Category 25, Record 2 data structure (e.g., Table 3). The passenger type field identifies the passenger type code for which this Record 3 table is applicable. The passenger type FFY matches the passenger type in the submitted query (e.g., Table 1). The number of flight segments field indicates the maximum number of flight segments per fare component that can be used for the resulting award data. In the Table 4 example, the value is 99, basically representing that there is no real limit on the number of flight segments (e.g., no typical itinerary includes over 99 segments). The fare calculation formula indicator indicates the calculation method for determining the award redemption. For example, a value of "S" can be used to indicate that the reward is specified using the amount of the reward credit needed for a particular itinerary. A value of "A" can be used to indicate that an award redemption formula is used to calculate a discount off of a published fare upon redemption of a specified amount of award credit. For example, 1000 miles might allow a $100 discount off of a published fare.

The specified fare field indicates the award credit that is redeemed for the particular itinerary. The currency field indicates the type of award credit to which the fare field refers to. The decimal field indicates a placement of a decimal in the number in the fare field. In the Table 4 example, the fare value is 20,000, the fare currency 1 is miles (MLG, or other value to be determined) and the decimal location at the zero place in the fare, indicating that no decimal is needed. Using these three values in combination indicates that the fare for this particular award redemption is 20,000 miles. In other examples, a second combination of the three fields is used to indicate needed co-payments for the award redemption. The prime RBD field indicates the reservation booking designator (RBD) for the award.

The frequent traveler award redemption process 120 determines (455) whether there are any other additional constraints, such as blackout periods. If there are no additional constraints, the frequent traveler award redemption process 120 generates (465) matching itineraries and transmits the matching itineraries to the client 105. If there are additional constraints, the frequent traveler award redemption process 120 retrieves (470) the additional constraints. The frequent traveler award redemption process 120 determines (475) whether there are any matches by, for example comparing table values to query data as described above. In addition to the award redemption produced in Category 25, in order to provide for any additional constraints, other categories of modified ATPCO data structures can hold the remaining award conditions. For instance, Category 11—blackouts can hold blackout dates applicable to value awards. Category 5 and 12 (advance reservations and ticketing & surcharges) can provide advance reservation requirements and fees associated with reservations made in less than the allotted time frame.

Table 5 illustrates a general cross reference of frequent flyer award redemption data attributes and where they can be placed in modified ATPCO fare by rule data structures.

TABLE 5

| Frequent Flyer Award Redemption Data Attribute | Fare By Rule Data Structure |
|---|---|
| Type of Award and Pricing Action (i.e. Frequent Flyer Award Redemption - Specified or Calculated, online or partner or interline, flat mileage award or co-pay, etc.) | Record 8 - Account Code<br>Category 1 - Account Code<br>Category 25 - Record 3 - Fare Calculation Indicator<br>Base Table No. 989 |
| Award Code | Category 25 - Record 3 - Fare Class Field |
| Award Code Effective Date | Category 25 - Record 2 - Effective Date<br>Category 15 - Sale Effective Dates<br>Category 14 - Travel Effective Dates<br>Category 25 - Record 3 - Override Date Table 994 |
| Class of Service (Cabin) for Award | Category 25 - Record 3 - Fare Type field |
| Embargo Dates | Category 11 - Blackout Dates |
| Region Allowed for Award | Record 8 - User Defined Zone Tables 978 or Locs 1 & 2; and, Category 25 - Record 2 - User Defined Zone Tables 978 or Locs 1 & 2. |
| Long & Short Haul Determination | Category 25 - Record 3 - Minimum and Maximum Mileage fields |
| Award Restrictions | Applicable FBR categories |
| Award Routing | Category 25 - Record 3 - Routing Tariff & Routing Number fields |
| Cost of Award:<br>Mileage Required<br>Co-Payments | Category 25 - Record 3 - Percent Field<br>Category 25 - Record 3 - Specified Fare No. 1<br>Category 25 - Record 3 - Specified Fare No. 2 |
| Award Rule - OW/RT/Mileage | Category 25 - Record 3 - OW/RT field<br>Category 25 - Record 3 - Mileage (Minimum and/or Maximum fields) |
| Award Rule Start Date | Category 25 - Record 2 Effective Date; and/or<br>Category 14 - Travel Restrictions<br>Category 3 Seasonality |

TABLE 5-continued

| Frequent Flyer Award Redemption Data Attribute | Fare By Rule Data Structure |
|---|---|
| Award Rule End Date | Category 14 - Travel Restrictions; and/or Category 3 Seasonality |
| Travel By Date | Category 14 - Travel Restrictions - Final Travel |
| Aircraft Type | Category 4 - Flight Restrictions |
| Cities/Airports Allowed | Markets: Record 8 and Category 25 Record 2 Locales and User Defined Zone Tables Via Points: Record 8 - Loc 3 and Cat. 4 Flight Restrictions. |
| Booking Inventories | Category 25 - Record 3 - Prime RBD and RBD Table 999, and in-house Mixed Class of Service Table |
| Gateway Cities | Category 4 - Flight Restrictions, and Category 8 - Stopovers - Gateway fields, Travel Segment Indicators in Geo Locs for various categories. |
| Valid Carriers/Partner Airlines | Record 8 - Joint Carrier Table 997, Record 2 Joint Carrier Table 997, and Category 4 - Flight Restrictions |
| Stopovers | Category 8 |
| Open Jaw | Category 10, Sub-Category 101 |
| Ticketing Requirements | Category 15 - Sales Restrictions |
| Standby | Category 5 - Advance Res & Tkting |
| Itinerary Changes | Category 16 - Penalties |
| Open Segments | Possible addition to Cat. 4 Flight Restrictions, or Cat. 9 Transfers |
| Advance Booking Requirements | Category 5 - Adv Res & Tkting |
| Directionality | Record 8 Directional Indicator; and, Category 25 Record 2 string |

If there are no additional constraints, or if there are constraints and the frequent traveler award redemption process 120 determines (475) that there are matches with the additional constraints, the frequent traveler award redemption process 120 generates (465) matching itineraries (for which earned travel credit, and co-pay if applicable, can be redeemed) and transmits the matching itineraries to the client 105.

Figure 5:
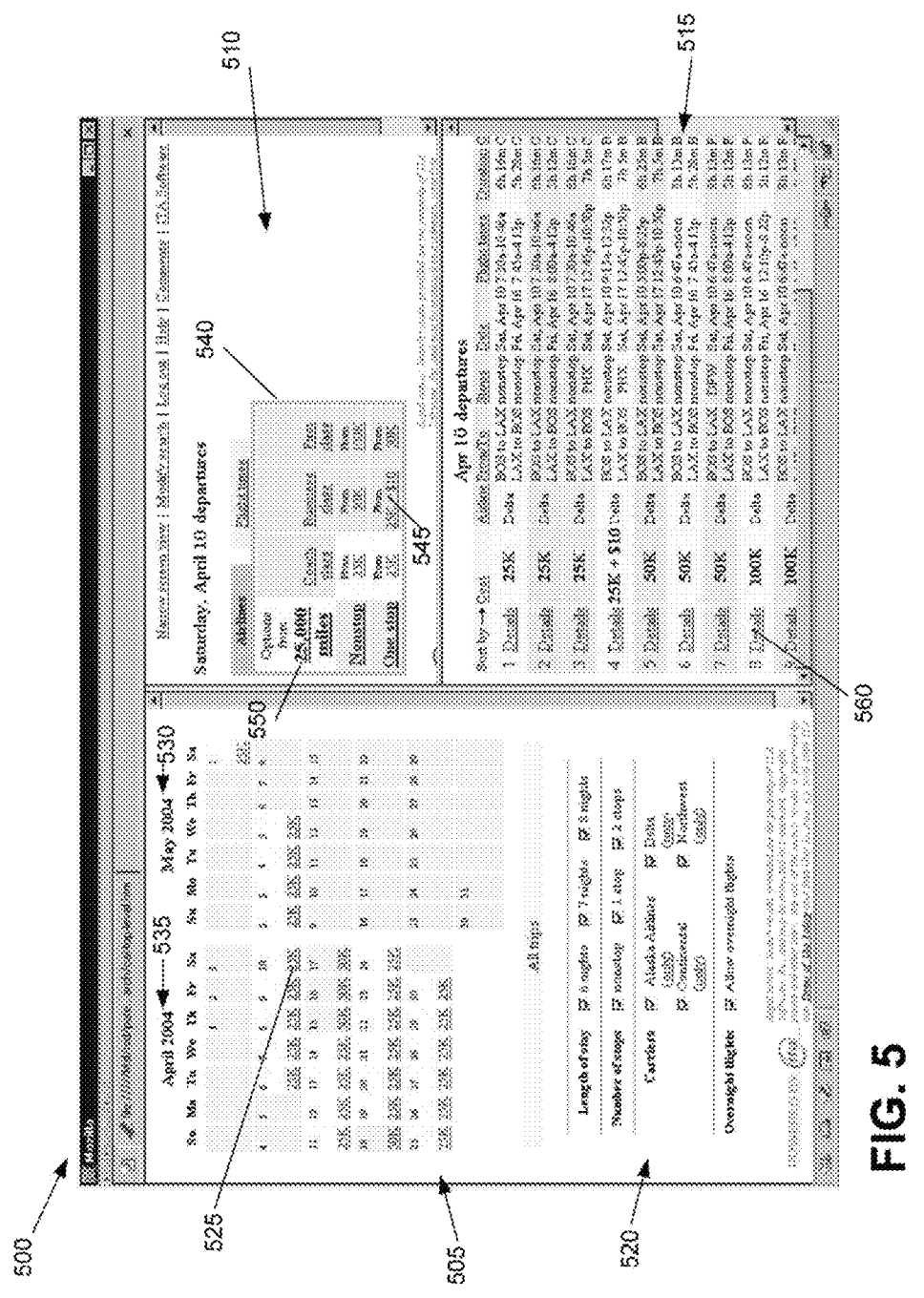

Referring to FIG. 5, a screenshot 500 that client 105 can generate to display matches to the query is shown. The screenshot 500 includes three regions 505, 510, and 515, each displaying matching possible award redemptions (e.g., possible travel options that can be purchased using travel award credit) in different formats. The first region 505 includes a calendar view, the second region 510 includes a tabular view, and the third region 515 includes a list view. The first region 505 also includes an additional user input area 520 that enables a user to enter inputs that affect the display in regions 505, 510, and 515. These include length of stay, number of stops, carriers, and overnight flights.

The calendar view in the first region 505 displays a calendar that includes, for example, two months 530 and 535. Days in the calendar include indicators 525 indicating that one or more award redemptions are possible for those days, meaning, for example, that the date of a flight holding a particular award inventory from or to a departure or arrival location falls on that day. The indicator 525 that is displayed can vary. For example, in screenshot 500, the calendar days display the lowest cost (e.g., 25K, representing a cost of 25,000 miles) for an award redemption possible on that day. Other information can be represented to the user by displaying additional or alternative text, varying the color of the background of that day or of the indicator 525. Other information can also include, for example, a co-payment value, an airline name, a class of seat, a number of stops, capacity controls, and the like. Capacity control information indicates whether the airline has capacity restrictions for the use of the award redemption, such as limited inventory on certain flights, restriction dates, and the like. For example, a red background for a particular day can be used to indicate that capacity-controlled flights are possible for award redemption for that day, along with a blue indicator 525, used to indicate that only one-stop flights are possible for award redemption for that day. As can be seen by the first region 505, the calendar view advantageously enables a user to view in a single display all of the dates award redemption is possible so the user can conveniently find out more details about awards according to dates in which the user has interest. The calendar view also allows the user to view in a single display those dates on which travel has a higher cost (e.g., April 15-18). More detailed description about the use of a calendar view for travel itineraries can be found in U.S. patent application Ser. No. 10/272,521 filed Oct. 16, 2002 entitled "Flexible-Date Travel Queries" by Rodney Daughtrey, et al., assigned to the assignee of the invention, and the contents of which are hereby incorporated by reference.

The indicator 525 can also serve as a hyperlink or control to change the displays in regions 510 and 515. In screenshot 500, indicator 525 serves as a control to change the display of the content in the second region 510 and the third region 515. When a user selects the indicator 525 (e.g., moves a cursor over the indicator 525 and pushes a mouse button), the regions 510 and 515 display the one or more award redemptions (and/or summaries thereof) possible for that particular day (i.e., April 10). This is one way in which the regions 505, 510, and 515 are associated with each other, and through that association, an action in one region can cause changes in one or more of the other regions. After the user selects indicator 525, the user can search through the possible award redemptions using the tabular view in region 510 or a list view in region 515.

The tabular view in region 510 includes a matrix 540 that summarizes one or more award redemptions. As described above, in screenshot 500, the matrix summarizes the possible award redemptions for April 10. The matrix 540 includes three rows and four columns, for a total of twelve cells. Each cell has an indicator that indicates a summary based on one or more criteria. The cells in the first row and the first column indicate each criterion for summarizing the possible awards. The second, third, and fourth columns indicate summaries based on coach class awards, business class awards, and first class awards, respectively. The second and third rows indicate summaries based on number of stops. Cells that intersect two criteria summarize the awards that meet both criteria. For example, cell 545 summarizes awards that meet both first class and one-stop criteria. Cell 550 summarizes all of the awards in matrix 540.

Although the matrix 540 in the second region 510 summarizes the departures for one day, the matrix 540 can summarize the award redemptions for a larger set of award redemptions. For example, the matrix 540 can summarize all awards in the calendar view. Displaying a summary of all of the awards can be a default when the matrix 540 is first displayed. More detailed description about the use of a tabular view for travel itineraries can be found in U.S. patent application Ser. No. 09/431,679, filed on Nov. 1, 1999, assigned to the assignee of the invention and the contents of which are hereby incorporated by reference.

The indicators on each of the cells in matrix 540 can also serve as hyperlinks or controls to change the display in region 515. In screenshot 500, for example, cell 550 includes the indicator "Options for 25,000 miles." If a user selects this indicator, the list region 515 changes to display all of the awards summarized by matrix 540. This can be a default when the list in region 515 is first displayed. Cell 545 includes the indicator "From 50K". If a user selects this indicator, the list region 515 changes to display all of the awards summarized by cell 545, which are one-stop, first class awards. When a user selects this indicator, only row 7 of the list in region 515 is displayed. Similarly, if the user selects the indicator "Business class" in matrix 540, then only the awards, which are business class, are displayed, namely rows 4-6 of the list in region 515.

The list in region 515 displays the details of the individual awards possible. The content displayed in the list can be selected, for example, by a default value and/or by using the calendar view of region 505 or the tabular view of region 510. The user an also manipulate the list view by using hyperlinks or controls directly in the list in region 515. For example, the list can be sorted by any of the headings in the first row of the list. The list in screenshot 500 is sorted by cost. If the user selects the indicator 555, labeled "Flight times", the list is re-sorted by the flight times. The "Details" indicator 560 enables the user to view more details about the corresponding award.

Figure 6:
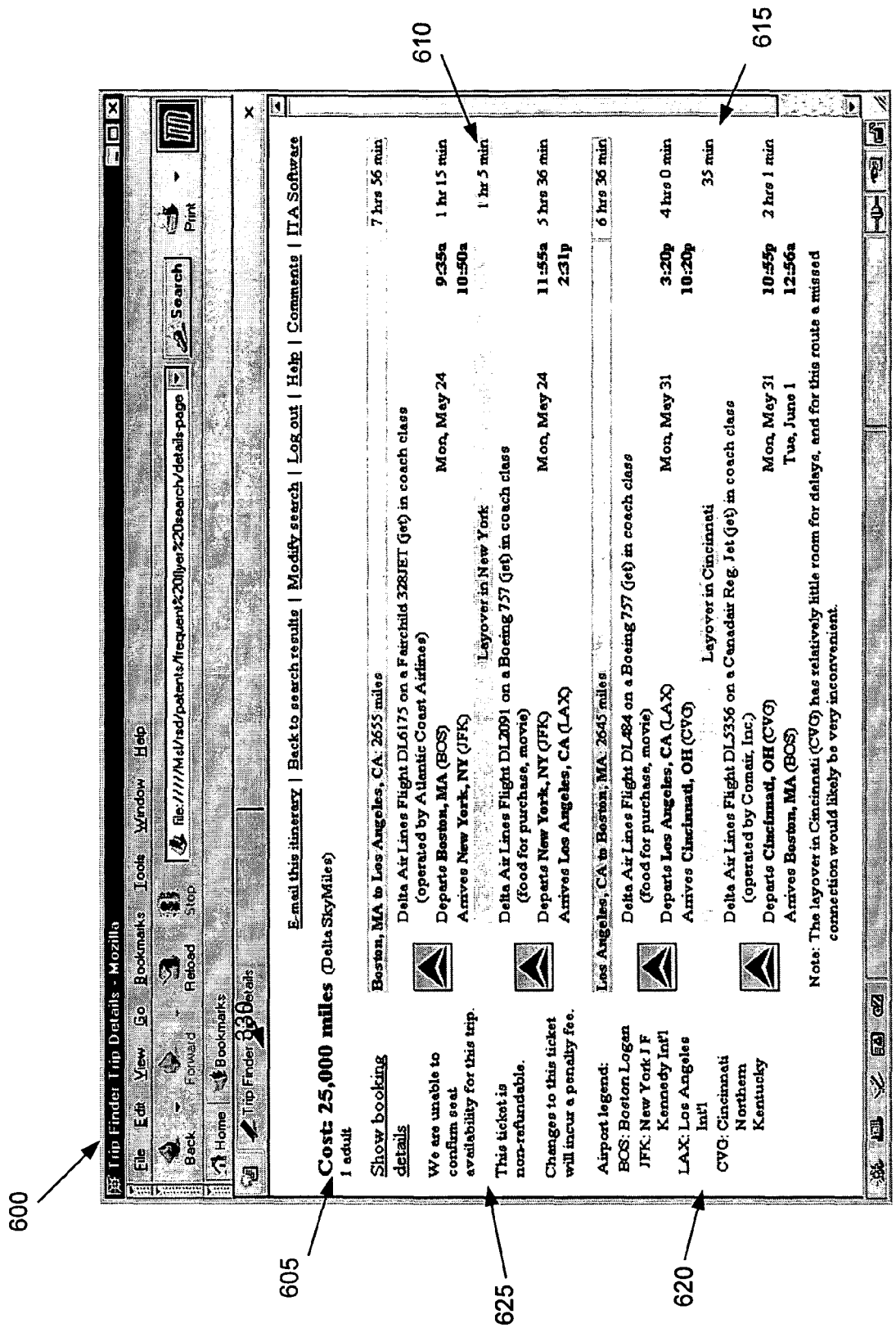

Referring to FIG. 6 a screenshot 600 that client 105 displays when the user selects indicator 560 is shown. FIG. 6 an "itinerary detail" page for a frequent flyer search. As an example, FIG. 6 shows a snapshot including a list of travel options for outbound 610 and return 615 portions of the trip. The screenshot 600 includes a legend 620 for the airport abbreviations used as well as a total cost field 605 that displays the cost of the travel options in miles. The screenshot 600 presents information for quickly notifying travelers of undesirable characteristics of travel options 625 and other warning messages. Although, not shown, the screenshot 600 could also highlight discontinuous airports, e.g., where the departure airport and arrival airports are different from the first and last legs of a trip Commonly considered undesirable characteristics of a travel option or set of travel options, such as long-duration layovers, short-duration layovers which increase your risk of missing the connecting flight, overnight flights, non-refundability of tickets, ticket change fees, terminal changes at connection points, and unknown seat availability are rendered in red text in an attempt to indicate a sense of warning or alarm. Other messages that are considered instructive are rendered in other, more calming colors (for example, green) text in an attempt to draw the reader's eye and to impart a helping, assistive tone to the text. Moreover, the color and amount of the text on the screen is an indicator of the general desirability of the travel option; that indication is gained quickly with just a visual scan of the text as a whole.

The examples described above employ ATPCO data structures used in different ways and/or modified ATPCO fields and values. The frequent traveler award redemption process 120 can of course be implemented using non-ATPCO rules rendered into non-ATPCO data structures, i.e., data structures that do not follow or that are not compliant with the ATPCO data structures. These non-ATPCO data structures can be user-defined data structures, examples of which are provided below, and other third-party fare rule information, such as the SITA AIRFARE database, modified in analogous ways to the ATPCO modifications described herein. Use of non-ATPCO data structures allows the addition of other features that are not found in nor can be incorporated in the modified ATPCO data structures. Such non-ATPCO data structures can also allow the elimination of fields in the ATPCO structure that are not needed to determine a frequent traveler award redemption.

Examples of non-ATPCO data structures as discussed below include RFD Fare And Rule Browser by ITASoftware, Inc. This product provides customers with view access to all public fares and rules in a database maintained by e.g., ITA, as well as to the customer's own private fares and rules. These fares and rules are received primarily from ATPCO and therefore follow the ATPCO standard structure of fields and values in an XML compatible format. However, over and above ATPCO data, the RFD Fare And Rule Browser includes additional elements and attributes as extensions to ATPCO fares and rules. Moreover, remote users can have update capabilities of these RFD templates, so that in addition to being able to view existing data on screens containing the values already coded, both new data can be added to skeletal templates and existing data can be revised on the templates holding the values that have already been coded.

The following description describes the use of both modified ATPCO data structures and non-ATPCO data structures in more detail.

Figure 7:
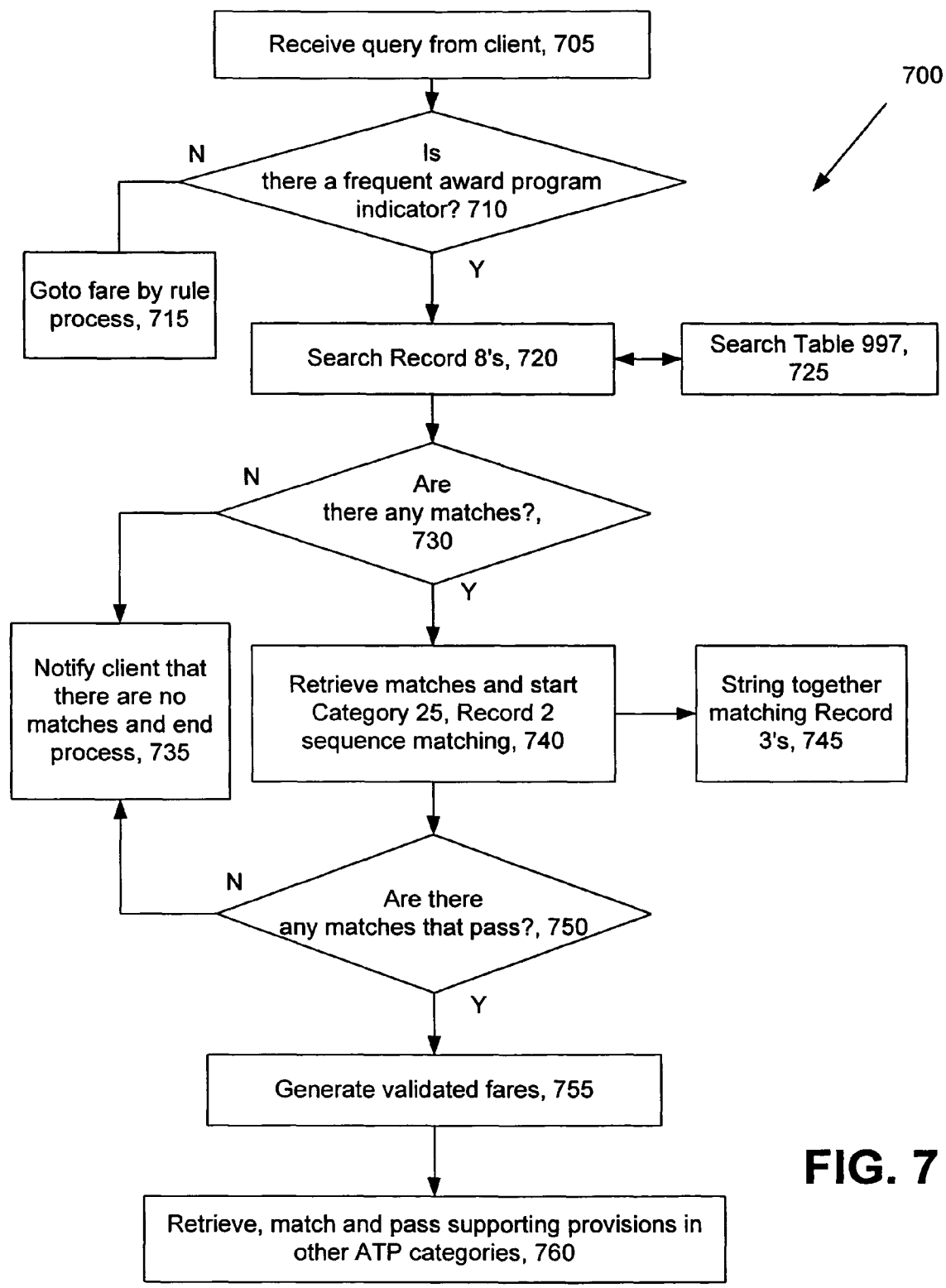
FIG. 7 is a flow chart of a process to determine frequent traveler award redemptions by rule using ATPCO data structures.

Referring to FIG. 7, a frequent traveler award redemption process 700 starts with receiving (705) a query that identifies the passenger type code (PTC) as a frequent flyer and also indicates the desired market/itinerary. In addition, the account code in the query also indicates that this request is for a frequent flyer award redemption via a unique account code (and/or via unique PTCs) to be established for this purpose. The query can include these unique codes, so that the process 700 determines (710) that this is an award redemption search. If there was no indication in the query that this was an award redemption search, then process 700 would go to a traditional faring process (e.g., 215). The award redemption search starts searching (720) Record 8's to determine (730) whether there are any matches of the unique codes in the query with the same account code/PTC held in the Record 8(s) established for frequent flyer award redemptions. Several fields can be used in the current Record 8 in the initial validation and filter process. Some fields are, for example, primary passenger type (including a frequent flyer passenger type code), passenger eligibility, including the account code, and geographic scope tables and/or loc fields that identify award regions. Process 700 can also search (725) the joint carrier table 997; i.e. "partner table", for optional carrier preferences expressed in the query or when no carrier preference is expressed to determine whether there are other carriers who participate in the associated frequent flyer award redemption program. With the above information, process 700 can determine if there may be a frequent flyer award redemption fare by rule for which the passenger may qualify.

If there are no record 8 matches (730), process 700 notifies (735) the client 105 that there are no frequent flyer award redemption programs that match the data in the query. If there are matches (730), then to determine if the passenger is eligible, the process 700 proceeds to the Category 25 for the tariff/rule/carrier(s) cross-referenced in the Record 8. Within the fare by rule Category 25, process 700 starts (740) the attempt to match a Record 2 sequence (740). Within the matching Record 2 sequence (740) the search for Category 25 Record 3's (745) that match to the query data takes place. If there are Record 3 tables that match and pass (750), the process 700 can produce validated fares (750) (represented as award credit), based on the matches. Following this, supporting provisions coded in the other ATP categories in the fare by rule are validated 760 (and in a few cases, where an award is based on a percent discount of a published fare, the supporting provisions are contained in a published base fare). As described in more detail below, the fare process for frequent award credit travel redemption follows the same processing as ATPCO fare by rule data structures with certain exceptions that are noted herein. Ultimately, availability is checked (e.g., process 240) against the frequent flyer booking code requirements (e.g., the reservation booking designator "RBD" data) to confirm the inventory set aside for such award(s) is available for booking.

In the sections that follow, more detailed information regarding the processing of the aforementioned Record 8 and the Category 25 Records 2 and 3 is provided.

Table 6 illustrates an example Record 8, and indicates which fields need not be used for the frequent flyer award redemption fare by rule application. In addition, unique frequent flyer values/conventions are noted. Differences between the ATPCO Record 8 and the non-ATPCO data structures are also noted.

TABLE 6

| Record 8 Field & Location | Match/ Action | Definition/Processing |
|---|---|---|
| RECORD TYPE Byte 1 | Key Match | 8 = Record 8 |
| ACTION Byte 2 | Key Match | 2 = New data (add to the database) 3 = Change (Update existing records in the database). |
| REC ID Byte 3-5 packed/3-10 unpacked | Key Match | Data Base maintenance number in data load processing. (Matches changed Record 8s against the current one in the database.) |
| CAT 35 INDICATOR Byte 6 packed/11 unpacked | N/A | Indicates the Fare by Rule is in conjunction with Category 35. Need not be used for Frequent Flyer Record 8s. |
| CXR CODE Bytes 7-9 | Match | Identifies the carrier to which the record applies. This refers to the carrier filing a particular Frequent Flyer Award Redemption program. The carrier coded here matches to the sales carrier identified in the incoming query and also links the Record 8 to the appropriate TRF/CXR/RUL and Record 2 for the Category 25 Fare by Rule. |
| PRIME PASSENGER TYPE CODE Bytes 10-12 packed/ 15-17 unpacked | Match | Matches the PTC from the Frequent Flyer query. This PTC code is also matched to the Category 25 Record 3. |
| PASSENGER STATUS fields: | | Further qualifies the PTC status. |
| APPL Byte 13 packed/18 unpacked | Match | Blank = Following Allowed N = Following Not Allowed |
| PSGR Byte 14 packed/19 unpacked | Match | N = Nationality (of Locale below) R = Residency (of Locale below) S = Ship Registry (of Locale below) E = Employee (of Locale below) (Values "S" and "E" need not be used in the non-ATPCO data structure, while additional values may be added.) |
| Type Byte 15 packed/20 unpacked | Match | A = Area (pertaining to Passenger Status above) Z = Zone (pertaining to Passenger Status above) N = Nation (pertaining to Passenger Status above) S = Country and State (pertaining to Passenger Status above) C = City (pertaining to Passenger Status above) |
| Loc Bytes 16-20 packed/ 21-25 unpacked | Match | Applicable Area/Zone/Nation/State/City applicable to the Passenger Status above. |
| ID Byte 21 packed/26 unpacked | N/A | Indicates that identification of passenger status is required at ticketing. Need not be used for Frequent Flyer Award Redemption FBRs. |
| AGE (MIN & MAX) Bytes 22-25 packed/ 27-30 unpacked | N/A | Indicates the specified age requirements for PTC above. Need not be used for Frequent Flyer Award Redemption FBRs. |
| PSGR OCC Bytes 26-29 packed/ 31-36 unpacked | N/A | The $1^{st}$ through last passenger occurrence of the PTC above. Need not be used for Frequent Flyer Award Redemption FBRs. |
| QUALIFYING ACCOUNT CODE Bytes 30-49/37-56 unpacked | Match | 20-byte alphanumeric. Matches a unique Frequent Flyer Account Code Identified in the query. |
| QUALIFYING TICKET DESIGNATOR | Match | Identifies the ticket designator used to qualify a passenger for the fare by rule. This matches to Passenger information entered at time of query. Need not be used for frequent flyer award redemption FBRs. |

TABLE 6-continued

| Record 8 Field & Location | Match/Action | Definition/Processing |
|---|---|---|
| Bytes 50-59/57-66 unpacked TARIFF NUMBER Bytes 60-61/67-69 unpacked | Action | Identifies Fare by Rule Tariff number that applies to the Record 8. This Tariff Number links to the CAT.25 Record 2 Fare by Rule. |
| RULE NO Bytes 62-65/70-73 unpacked | Action | Identifies the Fare by Rule number that applies to the Record 8. This rule number links to the CAT.25 Record 2 Fare by Rule. |
| JOINT CARRIER TABLE 997 (Referred to as "Partner Table") in the Frequent Flyer FRB product) Bytes 66-68/74-81 unpacked | Match | The data within the Joint Carrier Table (Partner Table) is a match to the partner carriers who also participate in the owning carrier's Frequent Flyer Award Redemption program, and specifically participate in a particular award. |
| RESERVED Bytes 69-73/82-86 unpacked | N/A | filler |
| DIRECTIONAL INDICATOR Byte 74/87 unpacked | Match | F - From Loc. 1 (Fare Selection/Generation) T - To Loc.1 (Fare Selection/Generation) Blank = Between/And Match to the direction of travel for the fare/award being generated. |
| GLOBAL INDICATOR Bytes 75-76/88-89 unpacked GEO SCOPE: | Match | Further defines the route of travel. |
| TYPE Byte 77 packed/90 unpacked | Match | The Type of GEO LOC that follows: A = Area Z = Zone N = Nation S = Country and State C = City |
| LOC 1 Bytes 78-82 packed/ 91-103 unpacked OR LOC 1 TABLE 978 Bytes 83-85 packed/ 96-105 unpacked (User Defined Zone Table) | Match | Applicable Area/Zone/Nation/State/City used for matching to a terminal point of the applicable fare component being generated. OR Table 978 number containing both the Type and applicable Areas/Zones/Nations/States/Cities used for matching to a terminal point of the applicable fare component being generated. |
| TYPE Byte 86 packed/104 unpacked | Match | The Type of GEO LOC that follows: A = Area Z = Zone N = Nation S = Country and State C = City |
| LOC 2 Bytes 87-91 packed/ 105-109 unpacked OR LOC 2 TABLE 978 Bytes 92-94 packed/ 110-117 unpacked (User Defined Zone Table) | Match | Applicable Area/Zone/Nation/State/City used for matching to the other terminal points of the applicable fare component being generated. OR Table 978 number containing the Type and applicable Areas/Zones/Nations/States/Cities used for matching to the other terminal point of the applicable fare component being generated. |
| TYPE Byte 95 packed/118 unpacked | Match | The Type of GEO LOC that follows: A = Area Z = Zone N = Nation S = Country and State C = City Blank = No Geo Spec Location |
| LOC 3 Bytes 96-100 packed/ 119-123 unpacked | Match | Matches the Passenger Itinerary information and is used to further restrict the geographic application by requiring that all travel be wholly within the location specified. |
| PASSENGER TRAVEL ORIGIN Bytes 101-108 | Match | Matches to the Passenger Itinerary Information for the journey origin of the passenger. |
| RESERVED Bytes 109-115 | N/A | filler |
| BATCH Bytes 116-120 | N/A | Identifies the person/carrier that submitted the batch for processing. |
| MCN Bytes 121-124 | Action | Indicates the subscription unit of work at ATPCO. This is used for data base maintenance. |

TABLE 6-continued

| Record 8 Field & Location | Match/Action | Definition/Processing |
|---|---|---|
| EFFECTIVE DATE Bytes125-128 | Match | The first date the Record 8 is in effect. This is a maintenance date. |
| NUMBER OF SEGMENTS Bytes 133-134 | Action | Occurrences of the data encoded for the following bytes 135-137. |
| SECONDARY PASSENGER TYPE CODE Bytes 135-137 | Match | Matches the Secondary Passenger Type for passenger eligibility information. This can potentially be used for Frequent Flyer awards programs allowing for Companions. |

Since there are no published fare records associated with the frequent flyer award redemption fare by rule application, there are no Record 1s to use for initial processing. So the first step in processing for these rules can begin with the ATPCO Record 8 instead. For carriers filing via ATPCO, Record 8s referencing ATPCO tariffs can be input and transmitted in ATPCO subscriptions. Otherwise, if non-ATPCO tariffs are preferred, data can be input into unique, data structures and transmitted directly to the administrator of the other system. When an itinerary/query is submitted and identified as a frequent flyer award redemption request, the frequent traveler award redemption process 120 retrieves all Record 8s and matches as many as possible based on the match fields.

In an ATP compliant example, the following private carrier fare by rule tariffs illustrated in Table 7 can be used to house frequent flyer award redemption FBRs. In a non-ATPCO system, one frequent flyer award redemption FBR tariff encompassing all geographies may be adequate.

TABLE 7

| Tariff Code | Tariff No. | Global Indicator | Geographic Scope of Tariff |
|---|---|---|---|
| FBRNAPV | 191 | NA | Within/between US/CA, between US/CA-PR/VI, within PR/VI |
| FBRINPV | 864 | IN | US/CA-Area 1/Area 2/Area 3 |
| FBRA1P | 894 | AL | Within Area 1 (except to/from US/CA) |
| FBRA2P | 903 | AL | Within Area 2 |
| FBRA3P | 912 | AL | Within Area 3 |
| FBRA12P | 878 | AL | Between Area 1 (except US/CA) and Area 2 |
| FBRA13P | 885 | AL | Between Area 1 (except US/CA) and Area 3 |
| FBRA23P | 901 | AL | Between Area 2 and Area 3 |

Referring back to Table 6, one basic match to Record 8 can be by frequent flyer passenger type code(s) (PTCs) account code, market and dates. Once a Record 8 is matched for a given passenger type, account code, and fare component, the tariff/carrier/rule information in that Record 8 is used to find the applicable Category 25 for that same tariff/carrier/rule, as coded in the Record 8.

Record 8s vary by tariff, carrier and rule number. More than one Record 8 may be found that relates to the applicable market and frequent flyer passenger. When multiple Record 8s exist for a given carrier and passenger type, the relationship between each record is "OR". The system (e.g., frequent traveler award redemption process 120) retrieves all matching Record 8s that pertain to frequent flyer award redemptions that may apply to the frequent flyer identified in the query. This process is unlike Record 2 processing, which allows one match, but is consistent with normal Fare By Rule processing logic.

When a positive match to Record 8 is made, the system continues on to the Category 25 Record 2s for that tariff/carrier/rule. Following is a more detailed description of the Record 8 fields charted in Table 6, with descriptions of how specific fields would be used for frequent flyer award redemption FBRs.

The "CATEGORY 35 INDICATOR" is an optional field and can be used to indicate the presence of a Category 35 (Negotiated Fares Restrictions) within the fare by rule being generated. If not used, this field can remain blank in ATP compliant versions, and does not have to be included at all in a non-ATPCO version.

The "CARRIER" field is matched to the sales carrier shown in the query as operating the frequent flyer program being used for the redemption award being produced. When searching for redemption awards for a given city pair, frequent traveler award redemption process 120 can check the Record 8 for both the owning carrier specified here as well as the partner carriers listed in the accompanying joint carrier ("Partner Carrier") table. This is a departure from current ATP processing, which would only interrogate the accompanying Joint Carrier Table 997 when a Carrier Code of YY, *M, or *J is coded for IATA, bilateral and domestic joint fares, respectively. Nevertheless, ATPCO cross-edits do not disallow this, so for both the ATP compliant version and the non-ATPCO version, the owning carrier would be identified in the CARRIER field, while all partners, including the owning "sales" carrier, in the award redemption program could be housed in the adjoining table. If there is no Partner Carrier Table, then it will be assumed that the Record 8 applies to the sales/owning carrier as well as partner carriers in the program. Actual partner participation will be coded in Category 4, Flight Restrictions. The initial determination of partner carriers will be accomplished by either an internal table, or by a listing of partners built into the query.

Each Record 8 contains a primary passenger type (PTC) identifying the frequent flyer passenger type code. Currently, ATP has designated "FFY for FREQUENT FLYER" passengers. There is also an "FFP—FREQUENT FLYER PREFERRED PTC". New PTCs may be produced and used either in addition to or in lieu of the existing frequent flyer PTCs. For example, in the case of AA's AAdvantage program, PTCs can be assigned for AAdvantage Executive Platinum members, AAdvantage Platinum members, and AAdvantage Gold members. Similarly, in the CO OnePass Reward program, a different PTC can be provided for their Platinum members (among others), since there are sometimes awards or special provisions applicable to their Platinum members that do not apply to other OnePass members. AS has MVP qualification levels, that may require separate PTCs. HP has Elite memberships and other carriers have similar structures.

The Frequent Flyer PTC in the Record 8 will be validated against the PTC identified in the incoming query. Normal PTC mapping hierarchy does not apply. However, mapping specific frequent flyer PTCs (such as Platinum members) to general frequent flyer PTCs (such as the standard FFY) can be used when comparing the PTC in the query against the PTC in the Record 8. When comparing the PTC in the Record 8 against the PTC in the Category 25, an exact match is required. No mapping takes place. Within Category 1—Eligibility, exact matches are required against the PTC in the query.

The Passenger Status fields define the status and any geographic restrictions for the passenger specified in PTC bytes 10-12. These fields can include, for example, the fields of application (APPL), passenger status (PSGR), and geographic specification (Type, Loc). The field of application (APPL) defines the positive or negative application of the passenger status data and/or geographic specification fields. When the application field=Blank, the status fields have positive application. When the application field=value N (negative), the passenger status and geographic specification have a negative application.

For frequent flyer award redemptions, the nationality and residency values are used infrequently to indicate geographic restrictions for the frequent flyer PTC. The value in the passenger status field (PSGR) specifies whether the PTC must be a citizen or resident of the location specified here. The ID, AGE, and PASSENGER OCCURRENCE (PSGR OCC) fields define further requirements for a passenger. In a typical reward redemption, however, it is not anticipated that there would be any need for these fields.

In addition to identifying the passenger type as a Frequent Flyer, the query is also identified as an award redemption request. To that end, unique account codes can be established to distinguish one carrier's award redemptions from other frequent flyer programs. Such account code in the query would match the value in the account code field in the Record 8. The account codes can also trigger the award redemption path and bypass the search for published fares.

Table 8 includes an example of hypothetical frequent flyer award redemption programs. A frequent flyer PTC requesting an award redemption can be identified in the query along with an account code. The award redemption and account code are matched to the applicable Record 8 PTC and account code, which in turn will point to the tariff and rule having the award redemption data, as illustrated in Table 8.

TABLE 8

| Carrier | Tariff | Rule | PTC | Account Code (Award Redemption Code) |
|---------|--------|------|-----|--------------------------------------|
| AA | FBRNAJ 873 | 1000 | FFY | R12345 |
| CO | FBRNAJ 873 | 2000 | FFP | R54321 |

Referring back to Table 6, the optional QUALIFYING TICKET DESIGNATOR field requires a matching ticket designator in the query. As it is optional, a frequent flyer award redemption program does not have to use this field. Even if the field is used, this Record 8 ticket designator is not used for final ticketing of the award. That information is obtained from Category 25 Record 3.

The tariff and rule number fields referenced in a Record 8 are used to link the Record 8 to the fare by rule and the Record 2s that they hold.

The ATPCO data structure includes a joint carrier table 997 in the Record 8. This table 997 is currently geared towards identifying participants in YY, multi-lateral or domestic joint fare by rules. However, for the frequent flyer award redemptions, this table 997 can be used for listing the partner airlines participating in the owning carrier's award redemption program. Multiple entries can be made in the table, and depending on how the entries are arranged, the carriers listed can be applied on either an AND or OR basis.

Table 9 illustrates an example table 997.

TABLE 9

| Table 997 Field & Location | Match/ Action | Definition/Processing |
|---|---|---|
| RECORD TYPE Byte 1 | Key Match | 3 |
| ACTION Byte 2 | Key Match | 1 = Cancel (delete) 2 = Add (new) |
| TABLE ID Byte 3-4 packed/ 3-5 unpacked | Key Match | 997 |
| TABLE NUMBER Byte 5-7 packed/ 6-13 unpacked | Key Match | 0000001-9999999 |
| CARRIERS: | | |
| CARRIER CODE #1 | MATCH | 2-character carrier code. In addition, the non-ATPCO data structure uses a "$" value in the Carrier Code #1 position to indicate any carrier participating in the program, and a second value is being added to indicate "any carrier other than the carrier owning the frequent flyer program". |
| CARRIER CODE #2 | MATCH | 2-character carrier code or "$", indicating any other (partner) carrier. |
| CARRIER CODE #3 | MATCH | 2-character carrier code or "$", indicating any other (partner) carrier. |

Note 1:
This table may have multiple sets containing Carrier Code 1, 2, and 3 within the same table number. In this example, the relationship between Carrier Codes #1, #2, #3 is "AND". The relationship between this set and additional Carrier Code 1, 2, and 3 sets is "OR"

Note 2:
ATPCO edits require at least 2 carriers per set. Therefore, even if an award were to apply via only one partner, the set would be coded with that carrier's code and a "$", indicating that travel is via that partner and any others coded in Category 4, Flight Applications. Other arrangements that eliminate the need for at least 2 partners is possible.

In addition to the joint carrier table, either a separate non-ATPCO table will be produced to maintain a list of all carriers participating in each carrier's frequent flyer award redemption program, or the query itself can house all partners by default. This separate table (or list of partners incorporated into the query) provides additional flexibility for coding the joint carrier table and/or Category 4—Flight Restrictions. For example, there are awards that are redeemable on all partners, so instead of having to list all of them, and similar to the example in Table 9 above, the "$" can be used to indicate "any partner carrier" (including the owning carrier).

Referring back to Table 6, the DIRECTIONAL INDICATOR field is a match field and further defines the direction of the fare being produced. In an ATPCO compliant data structure, the only permitted values for coding are 'F', 'T', and Blank. The 'F' indicates that the award ticket being produced is valid only from the locale coded in the geo scope loc 1 field of the Record 8 (e.g., Table 6) and 'T' indicates that the award ticket being produced is valid only to the locale coded in the geo scope loc 1. Blank indicates "between/and", signifying that the award redemption may be produced in either direction.

The GLOBAL INDICATOR field is a match field to the route of travel on the incoming query. For example, if the query is NYC-HNL-SYD, indicating a desired flight itinerary across the pacific from New York to Sydney, and the Record 8 has an AT (transatlantic) value in the global indicator field, this desired itinerary would "no-match". Only standard IATA global indicators are valid in this field.

The geography coded in the fields that follow the "GEO SCOPE" heading define the boundaries to match the city pairs in the query (itinerary) being submitted for a frequent flyer award redemption. The GEO SCOPE fields contain three locations, loc 1, loc 2, and loc 3. Loc 1 and loc 2 can be defined using existing geographic values, or using user produced zone tables (e.g., table 978). The location fields define the end points/fare break points that encompass the market identified in the frequent flyer award redemption query in order for there to be a match.

During processing of a frequent traveler award redemption, an attempt is made to match the first city of the query/itinerary to the value in the loc 1 field of the Record 8. If the city is encompassed by loc 1 or by the locales coded in the loc 1 user defined Table 978, the other end point in the award redemption query is checked against loc 2 (or loc 2 user defined table 978) of Record 8. If one or both of the locations in the query does not match and the direction is blank, then the cities or tables are "flipped" and the process is attempted again. Tables 10 and 11 illustrate an example where a Record 8 geographic scope is defined using user produced zone tables. Table 10 shows how loc 1 and loc 2 fields are defined for a particular Record 8 using user produced zone tables. Table 11 defines the two user produced zone tables for this example.

TABLE 10

| Record Type | PTC | LOC 1 User Produced Zone Table Entry | LOC 2 User Produced Zone Table Entry |
|---|---|---|---|
| 8 | FFY | 123 | 456 |

TABLE 11

| USER PRODUCED ZONES | |
|---|---|
| Table 123 | Table 456 |
| S US: CA | S: US: HA |
| S US: WA | |
| S US: OR | |
| S CA: BC | |

To provide an illustrative example, a frequent flyer award redemption query is submitted for a departure from Dallas/Fort Worth (DFW) and an arrival at Honolulu (HNL). The DFW departure location is compared with the loc 1 definition, which is defined by table 123. DFW is not encompassed by any of the states/provinces listed in Table 123. The cities or table are flipped, but DFW does not match to the other table (table 456) either. So this Record 8 is a "no-match". It is clear from the tables that the geographic scope of this award redemption is applicable for travel between the west coast (California, Washington, Oregon, and British Columbia) and Hawaii.

Referring back to Table 6, in addition to the end points covered in loc 1 and loc 2 fields either as values or in user produced zone tables, a third locale field (LOC 3) is provided to denote that all travel within the fare component is wholly within the location specified. So, for example, if a reward redemption is requested for locations within the U.S., the Record 8 can further restrict travel by coding US again in LOC 3. This can ensure that, even if there is no routing validation taking place, or no global direction limits when validating Category 25, the loc 3 field can limit award productions by only matching itineraries where all points specified in the query are in the US as well.

The PASSENGER TRAVEL ORIGIN field is a journey-based geography field used in conjunction with fares that require passengers originate their journey somewhere else, such as in "Visit USA" type fares. This field does not need to be used in a frequent flyer award redemption program. The BATCH, MCN, and EFFECTIVE DATE fields are used for database maintenance. The NUMBER OF SEGMENTS field is provided to list additional secondary discounted passengers such as companions.

The SECONDARY PASSENGER TYPE CODE field can be used for frequent flyer awards involving companion travel. The companion PTC can be identified in this field and then, within the matching FBR, additional details and calculation information can be coded in one of the discount categories, for example, Category 22—other discounts. The query can include both the primary frequent flyer PTC as well as the secondary PTC. In such a case, both values in the query need to match both PTCs in the Record 8 for a match to the Record 8.

As described above, Table 978 (referred to as user produced zone tables and user defined zone tables) was produced to enable the input and processing of multiple geographic types and locales that can be used in lieu of more limited values being specified in the geo spec loc fields. The user defined zone table is well suited for frequent flyer awards based on regions since these regions can be coded in this table.

At the Record 8 level, for the frequent flyer award redemption FBRs, Table 978 can be used as an initial filter so that the query/itinerary will only match to Record 8s pointing to awards offered within the desired region. Again in Category 25 Record 2, when different markets or regions have different provisions within the same governing tariff/carrier/rule, the user defined zone table can be used to differentiate provisions for different regions/sub-regions within the FBR.

As with other geographic location validation, the market identified in the frequent flyer award redemption query is matched against (or is determined to be encompassed by) the locales in the tables. Table 12 shows the fields held in table 978.

TABLE 12

| Table 978 Field & Location | Match/Action | Definition/Processing |
|---|---|---|
| RECORD TYPE Byte 1 | Key Match | '3' |
| ACTION Byte 2 | Key Match | 1 = Cancel (Delete) 2 = Add (New) |
| TBL ID Bytes 3-4 packed/3-5 unpacked | Key Match | For User Produced Zone Table Number 978, it will be '978'. |
| TBL NO Bytes 5-7 packed/6-13 unpacked | Key Match | Indicates a number that links the 978 Table to the associated Record. |
| APPL Byte 8 packed/14 unpacked | Action | Indicates whether the following GEO TYPE and GEO SPEC fields are to be applied negatively or positively. N = Not Permitted Blank = Permitted |

TABLE 12-continued

| Table 978 Field & Location | Match/Action | Definition/Processing |
|---|---|---|
| GEO TYPE Byte 9 packed/15 unpacked | Action | Indicates the type of geography to be found in Bytes 10-14. A = Area S = State Z = Zone C = City N = Country |
| GEO SPEC Bytes 10-14 packed/16-20 unpacked | Action | Indicates the applicable geographic location for the type specified above. |

The user defined zone tables equate to the region codes that carriers use to define the areas covered by different awards. Multiple positive applications within the table 978 share an 'OR' relationship. Multiple negative applications within the 978 Table share an 'AND' relationship. Table 978 enables the user to include or exclude geographic points anywhere within the table. In the ATPCO compliant example, the table allows up to 220 entries. Non-ATPCO data structures can be further expanded, if required.

Tables 13 and 14 provide another example of geographic scope encoded using table 978. Using a ATPCO compliant data structure, Table 13 shows FBR Tariff FBRINPV (864), which governs private fares produced between US/CA-Area 1/2/3. Table 14 shows FBRA1P (894), which governs private fares within Area 1 (except US/CA). When producing award redemptions within these areas, any smaller geography encompassed by these areas can be input in the Record 8 to limit award redemptions to such area. Or if all markets within these areas are eligible for award redemptions, then the Record 8 user defined zone tables reflects the entire area encompassed by the tariff.

TABLE 13

| | RECORD 8 LOC 1 Zone Table 978 Table #1234 | | | RECORD 8 LOC 2 Zone Table 978 Table #5678 | |
|---|---|---|---|---|---|
| APPL Byte 8 | GEO TYPE and GEO SPEC Bytes 9-14 | | APPL Byte 8 | GEO TYPE and GEO SPEC Bytes 9-14 | |
| Blank | N: US | | Blank | A: 1 | |
| Blank | N: CA | | Blank | A: 2 | |
| | | | Blank | A: 3 | |

TABLE 14

| | RECORD 8 LOC 1 Zone Table 978 Table 1234 | | | RECORD 8 LOC 2 Zone Table Table #5678 | |
|---|---|---|---|---|---|
| APPL Byte 8 | GEO TYPE and GEO SPEC Bytes 9-14 | | APPL Byte 8 | GEO TYPE and GEO SPEC Bytes 9-14 | |
| Blank | N: MX | | Blank | N: MX | |
| Blank | Z: 140 | | Blank | Z: 140 | |
| Blank | Z: 160 | | Blank | Z: 160 | |
| Blank | Z: 170 | | Blank | Z: 170 | |

But, smaller or larger geographic areas may be necessary when coding for specific awards. In the case of individual carrier award redemptions, carriers may be producing award redemptions for all markets served by such carriers and their partners, so in many cases all private carrier FBR tariffs will be invoked. And at the Record 8 level, the geographic scope tables can therefore reflect the entire geographic area encompassed by the tariffs.

However, specific award redemptions (award codes) may apply to a different geography. So within the actual award redemption rule, the CATEGORY 25 Record 2 sequences can have user produced zone tables to limit production of a particular award redemption to such limited geography.

As another illustrative example, if a frequent flyer award redemption query is submitted for travel between DFW and Caracas (CCS), the frequent traveler award redemption process 120 searches the Record 8s for a FBR tariff that encompasses this geography. If ATP tariffs are used, there will be a match to TARIFF FBRINPV (864), shown in Table 13 since DFW is in "N:US" (the U.S.) and CCS is in "A:1" (Area 1).

There may also be Record 8s for this tariff housing different frequent flyer award redemption rules. For illustration, in this example the query matches a Record 8 for this geography that points to an AA rule that governs, among others, their P35V award redemption (the AAdvantage Coach Class PlanAAhead Award availability between North America and either Central America, Colombia, Ecuador, Peru, or Venezuela, for 35,000 miles during peak travel times). Table 15 illustrates the AA Region Codes A and B that apply to P35V award redemptions.

TABLE 15

| Region Code A (Region Allowed for Award) | Region Code B (Region Allowed for Award) |
|---|---|
| '14' | '15' |

In Table 15, Region 14=North America, and Region 15=Central America, Colombia, Ecuador, Peru or Venezuela. So within the CATEGORY 25 Record 2 for this fare by rule, the user defined zone tables can be used to limit the production of P35V award redemptions to just the regions identified above. Table 16 provides an example table 978 that defines the geographic scope for the P35V award redemptions.

TABLE 16

| | RECORD 8 LOC 1 Zone Table 978 Table 1111 | | | RECORD 8 LOC 2 Zone Table Table 2222 | |
|---|---|---|---|---|---|
| APPL Byte 8 | GEO TYPE and GEO SPEC Bytes 9-14 | | APPL Byte 8 | GEO TYPE and GEO SPEC Bytes 9-14 | |
| Blank | N: US | | Blank | Z: 160 | |
| Blank | N: CA | | Blank | N: CO | |
| | | | Blank | N: EC | |
| | | | | N: PA | |
| | | | | N: PE | |
| | | | | N: VE | |

It is worth noting that since the P35V award redemptions include travel between Mexico and Central America/Colombia/Ecuador/Peru/Venezuela, in the ATP compliant data structures, another rule has to be set up in FBRA1PV (894) tariff to cover those markets. However, within non-ATPCO data structures, frequent flyer award redemption tariffs can be produced to encompass different or larger geographies, or could even encompass all geographies. In such cases, one award does not have to be duplicated in more than one tariff.

When matching the DFW-CCS example itinerary/query above to the user produced zone tables in the Category 25 Record 2, the following processing can be applicable. The frequent traveler award redemption process 120 compares the first city of the fare component to be validated (DFW) to the GEO SPEC field in the table 978. The frequent traveler award redemption process 120 processes data in the 978 table in a hierarchy. For example, negative limitations are processed before positive limitations, and with these subdivisions, specific to general. If the first location has a negative application in the loc 1 field, then frequent traveler award redemption process 120 exits from the 978 table. But if the first city is not in the table at all, the frequent traveler award redemption process 120 flips the city pair identified in the query, and tries to validate the second city (CCS) against the locales in the loc 1 user defined zone table. If the second location is not matched in the loc 1 table, then frequent traveler award redemption process 120 reads on to the next Category 25 Record 2.

If the first city in the query matches against a positive application in the loc 1 table, that 978 table is applicable for that location in the query. Thus, the frequent traveler award redemption process 120 goes on to validate the second city in the query against the loc 2 table. If the second city is not matched (positively) in the loc 2 table, then the frequent traveler award redemption process 120 flips the cities and tries to validate the second location in loc 1 and the first city in loc 2. If locations are not matched (positively), then the frequent traveler award redemption process 120 reads on to the next Category 25 Record 2.

In the ATPCO compliant data structures, at least one positively validated entry (Byte 8=Blank) in table 978 is generally needed to constitute an applicable table. The presence of a negative application in table 978 does not imply any other positive application. All positive applications are stated explicitly in the table 978. However, the non-ATPCO data structures can have negative entries without positive entries, allowing for more flexible and simplified coding.

There may be many sequences of category control records (Record 2s) for any given frequent flyer award redemption FBR tariff/carrier/rule/category 25. These records identify which itineraries further qualify for the award redemptions that will be produced in the attached Category 25 Record 3 tables. These tables are linked via a string of data table numbers that serve as a pointer to the actual Record 3s which physically house the frequent flyer award redemption production fields and accompanying provisions.

Once a frequent flyer award redemption itinerary/query has matched to a Record 8, that Record 8 tariff/carrier/rule number will point to the Category 25 tariff/carrier/rule. Then the redemption itinerary/query matches to the proper Record 2 sequence within Category 25. If a match is made within Category 25, then additional matching takes place within the string of Record 3 tables. If the query matches and passes all levels of Category 25, the system then goes on and attempts to match and pass the remaining categories in the same manner. For Record 2s matching, the itinerary/query is compared against the appropriate Record 2 match fields. These fields can include tariff/carrier/rule number, locations, fare application indicator, joint "partner" carrier table, and effective and discontinue dates.

When the Record 2 sequence has been matched, the rest of the Record 2 sequence, including the string of data tables is evaluated to determine the appropriate action to take in producing the award redemption. If a match is made to a Record 2 sequence, processing generally would not continue to read higher number sequences.

Process 120, in determining the frequent flyer award redemption FBRs, follows normal ATPCO/Industry Record 2 processing guidelines, but, as with other FBRs, there are certain exceptions. One exception to the guidelines is that the Record 8 is used to match to the Record 2 instead of a fare record or Record 1 fare class. Another exception involves unique FBR stringing rules. When a matching Category 25 Record 3 table is tagged NO DISCOUNT (i.e., the NO DISC field is coded with an "X") then processing stops, even when multiple OR tables exist in the set. For the frequent flyer award redemption FBRs, this "No Discount" field takes on the meaning "NO AWARD REDEMPTIONS". For FBR Category 25 Record 3 stringing, if a Record 3 is matched within a string, the system still reads through the other Record 3 tables as well, including OR tables, unless the No Discount tag is set. This applies to IF THEN sets as well, except that an "IF THEN" match does not read on to an ELSE table. Otherwise, even if an award redemption results, the system will continue to read on within the string for any additional awards that may apply, thus allowing multiple awards to be returned. For any FBR Category 25, stringing together tables with AND Relational Indicators is not allowed.

Another exception is that the FBR Record 2 for Category 25 does not contain the following fields: fare Class, OW/RT, routing, footnote, general rule and alt general rule (There are no footnotes or general rules for Category 25). Another exception is that the Record 2 for Category 25 includes User Defined Zone Tables in addition to the LOC 1 & 2 fields.

Table 17 illustrates the fields and values of Category 25 Record 2.

TABLE 17

| Category 25 Record 2 Field & Location | Match/ Action | Definition/Processing |
|---|---|---|
| RECORD TYPE Byte 1 | Key Match | '2' |
| ACTION Byte 2 | Key Match | Type of processing to be taken in connection: 2 = Add (New) 3 = Update (Change) |
| Rule Tariff Bytes 3-4 packed/3-5 unpacked | Match | Match to the Rule Tariff in the Record 8. |
| Carrier Code Bytes 5-7 packed/6-8 unpacked | Match | Matches to the Carrier Code on the Record 8. |
| Rule No Bytes 8-11 packed/9-12 unpacked | Match | Match to the Rule Number on the Record 8. |
| Category No Bytes 12-13 packed/13-14 unpacked | Match | '25' |

TABLE 17-continued

| Category 25 Record 2 Field & Location | Match/ Action | Definition/Processing |
|---|---|---|
| MCN Bytes 14-17 packed/16-23 unpacked | Action | Maintenance number used only during the Data base load process |
| Sequence No Bytes 18-21 packed/24-30 unpacked | Action | Determines the order in which matching the Record 2 is attempted. 0000000-9999999 |
| Loc 1 Type Bytes 22 packed/31 unpacked | Match | The type of geographic specification that follows: A = Area Z = Zone N = Country S = State C = City |
| Loc 1 Geo Spec Bytes 23-27 packed/32-36 unpacked | Match | Match the Area/Zone/Nation/State/City to one of the cities identified in the query. |
| Loc 1 Zone Table 978 Bytes 28-30 packed/37-44 unpacked | Match | Table number pointing to a table containing a mixture of multiple types and geographies. Match to one of the cities identified in the query. |
| Loc 2 Type Byte 31 packed/45 unpacked | Match | The type of geographic specification that follows: A = Area Z = Zone N = Country S = State C = City |
| Loc 2 Geo Spec Bytes 32-36 packed/46-50 unpacked | Match | Match to the other terminal point in the query. |
| Loc 2 Zone Table 978 Bytes 37-39 packed/51-58 unpacked | Match | Table number pointing to a table containing a mixture of multiple types and geographic specifications. Match to the other terminal point in the query. |
| Reserved Bytes 40-42 packed/59-71 unpacked | N/A | Filler |
| Fare Application Byte 53 packed/72 unpacked | Match | D = Domestic I = International Queries with both terminal points in the same country match to Domestic; if not, they are international. |
| JT Cxr Table 997 (Partner Carrier Table) Bytes 54-56 packed/73-80 unpacked | Match | A table matching to the partner carrier(s) providing transportation on the fare component in the query. 0000000-9999999 |
| Effective Date Bytes 57-60 packed/81-87 unpacked | Match | The first date in which the Record 2 is in effect. (Travel Date) YYMMDD |
| Discontinue Date Bytes 61-64 packed/88-94 unpacked | Match | The last date in which the Record 2 is in effect. (Sale Date) YYMMDD or 9999999 for no discontinue date. |
| Batch Bytes 65-69 packed/95-101 unpacked | Not Applicable | Employee initials plus a control number. Identifies the person that submitted the batch. |
| No Appl Byte 70 packed/102 unpacked | Action | X = No FBR award is to be produced for this sequence. |
| Reserved Bytes 71-77 packed/103-109 unpacked | N/A | Filler |
| # Segs Bytes 78-79 packed/110-112 unpacked | Action | The number of occurrences of the following information. |
| Relational Indicator Byte 80 packed/113 unpacked | Action | Relational Indicator for the following table: THEN IF OR ELSE |
| Cat No Bytes 81-82 packed/114-116 unpacked | Action | The Category number, in this case '25', but Category 25 can "IF" to a different category. |
| Table No Bytes 83-85/117-124 unpacked | Action | The table number of the Category 25 Record 3. |
| Inbound/Outbound Byte 86 packed/125 unpacked | Match | Indicates that the preceding table is only to be considered when processing the inbound or outbound fare component of the pricing unit. |

TABLE 17-continued

| Category 25 Record 2 Field & Location | Match/ Action | Definition/Processing |
|---|---|---|
| Directionality Byte 87 packed/126 unpacked | Match | I = Preceding table data applies to inbound travel only. O = Preceding table data applies to outbound travel only. Indicates that the preceding table is only to be considered when processing a certain direction of the fare. 1 = From LOC 1 to LOC 2 2 = To LOC 1 from LOC 2 3 = Originating from LOC 1 to LOC 2 4 = Originating from LOC 2 to LOC 1 |

Category 25 helps produce and support the frequent flyer award redemptions. The award redemptions can be handled similarly to other SPECIFIED FBRs. However, one difference is that instead of expressing a specified amount, the cost in mileage is coded instead. The Category 25 Record 3 data for frequent flyer award redemptions assists in performing the following functions: matching information to the query/itinerary data, calculating the cost in mileage, producing the award, and providing resulting award information.

As described above, the ATPCO FBR tariffs represent large groupings of geographic data, but do not always correspond to the groupings of award redemption data. This could result in having to code such award data in more than one ATP tariff. An alternate non-ATPCO data structure solution can designate one frequent flyer award redemption tariff that encompasses all geographies or designate different tariffs that correspond to different frequent traveler award regions. This is a departure from normal ATPCO tariff assignments, and can include the production of unique global code(s) for such tariff(s).

In review, in addition to the Category 25 Record 3, the following records and tables also support frequent flyer award redemption FBRs: Record 8—Fare by Rule, Table 997—Joint ("Partner") Carrier Table, Table 978—User Produced Zones, Record 2—Fare by Rule Category 25, and, on occasion, Base Fare Table 989. As described in connection with FIG. 2, starting with the passenger's itinerary in the query, processing attempts to find a matching Record 8, indicating that there are, in fact, frequent flyer award redemptions possible for the passenger and geography specified in the query. The Record 8 points to the tariff/carrier/rules holding such frequent flyer awards, and then the Category 25 Record 2s for such tariff/carrier/rules match to the query to further narrow down the applicable awards. And finally, the matching Record 2 for Category 25 will contain the Category 25 Record 3s in a string of data tables.

Within the Record 3 tables, there are more fields that need to be matched before an award redemption can be produced. One field applicable to frequent flyer award redemption FBRs is the PTC field. Other matching fields such as passenger status and override dates may also be used. Once the match to such fields is complete, the award redemption is produced according to the specified mileage information and resulting award information. In addition, the fare by rule can have further restrictions coded in the other categories as well. To validate other rule categories within the fare by rule, the resulting award information within Category 25 Record 3 is obtained and used to match to Record 2's for other fare by rule categories.

Table 18 illustrates an example of the Category 25 Record 3 fields, and indicates which fields are used for the frequent flyer award redemption fare by rule application. In addition, unique frequent flyer values/conventions are noted. Differences between the ATPCO Record 3 and the non-ATPCO data structures are also noted.

TABLE 18

| Category 25 Record 3 Byte Location | Match/ Action | Definition/Processing |
|---|---|---|
| RECORD TYPE Byte 1 | Key Match | Indicates the Record number for which the data is formatted. |
| ACTION Byte 2 | Key Match | Indicates the type of processing when loading the data - either new data (add to the database) or deleted data (purge from the database). 1 = Cancel (Delete) 2 = Add (New) |
| CAT NO Byte 3-4 packed/3-5 unpacked | Key Match | Indicates rule or category to which the data applies. For the Fare by Rule Category 25, it will be 25. |
| TABLE NO Byte 5-7 packed/6-13 unpacked | Key Match | Indicate a number that links the Category 25 Record 3 to the associated Category Control Records (Record 2). 0000000-9999999 |
| PASSENGER TYPE Byte 8-10 packed/14-16 unpacked | Match | Identifies the passenger type for which the data table is applicable. Matches to the Frequent Flyer in the query and Record 8 Primary PTC. |
| PASSENGER STATUS fields: | | |
| APPLICATION Byte 11 packed/17 unpacked | Action | Indicates the positive or negative application of the following fields for the specified passenger type above. |
| STATUS Byte 12 packed/18 unpacked | Match | Identifies the passenger status based on nationality or residency. The following values are used for frequent flyer awards: |

TABLE 18-continued

| Category 25 Record 3 Byte Location | Match/ Action | Definition/Processing |
|---|---|---|
| TYPE<br>Byte 13 packed/19 unpacked | Match | N = Nationality (of Locale below)<br>R = Residency (of Locale below)<br>A = Area (pertaining to Passenger Status above)<br>Z = Zone (pertaining to Passenger Status above)<br>N = Nation (pertaining to Passenger Status above)<br>S = Country and State (pertaining to Passenger Status above)<br>C = City (pertaining to Passenger Status above) |
| LOC<br>Byte 14-18 packed/20-24 unpacked | Match | Geographic location (Area/Zone/Nation/State/City) applicable for the PTC specified above. |
| PASSENGER ID<br>Byte 19 packed/25 unpacked | Action | Indicates that ID is required.<br>Need not be used for Frequent Flyer Award Redemption FBRs. |
| MIN PASSENGER AGE<br>Bytes 20-21 packed/26-27 unpacked | Match | Indicates the specified age requirements that further define the passenger type in bytes 8-10<br>Need not be used for Frequent Flyer Award Redemption FBRs. |
| MAX PASSENGER AGE<br>Byte 22-23 packed/28-29 unpacked | Match | Indicate the specified age requirements that further define the passenger type in bytes 8-10.<br>Need not be used for Frequent Flyer Award Redemption FBRs. |
| PSGR OCCURRENCE - FIRST<br>Byte 24-25 packed/30-32 unpacked | Match | Indicates the first occurrence of the specified passenger type in bytes 8-10 (e.g. second through fourth passenger) for which the table applies.<br>Need not be used for Frequent Flyer Award Redemption FBRs. |
| PSGR OCCURRENCE - LAST<br>Byte 26-27 packed/33-35 unpacked | Match | Indicates the last occurrence of the specified passenger type in byte 8-10 (e.g. second through fourth passenger) for which the table applies.<br>Need not be used for Frequent Flyer Award Redemption FBRs. |
| TRAVEL WHOLLY WITHIN - TYPE<br>Byte 28 packed/36 unpacked | Match | Indicates all ticketed points on the fare component are wholly within a specified Type for the LOC below. |
| TRAVEL WHOLLY WITHIN - LOC<br>Bytes 29-33 packed/37-41 unpacked | Match | Indicates all ticketed points on the fare component are wholly within the Area/Zone/Nation/State/City specified here. |
| RESERVED<br>Byte 34 packed/42 unpacked | N/A | Filler |
| PASSENGER TRAVEL ORIGIN - TSI<br>Bytes 35-36 packed/43-44 unpacked | Match | Indicates the origin of the journey are at the Travel Segment Indicator coded here. Currently the following are considered valid TSIs for CAT.25:<br>33 - Outside<br>59 - Departure of Journey Origin<br>63 - Departure of $1^{st}$ International Sector of the Journey |
| PASSENGER TRAVEL ORIGIN - TYPE<br>Byte 37 packed/45 unpacked | Match | The origin of the journey are at the specified Type of location for the LOC below. |
| PASSENGER TRAVEL ORIGIN - LOC Bytes 38-42 packed/46-50 unpacked | Match | The origin of the journey are be at the Area/Zone/Nation/State/City specified here. |
| NUMBER OF FLIGHT SEGMENTS<br>Byte 49-50 packed/57-58 unpacked | Match | Indicates the maximum number of flight segments (coupons) per award fare component allowed. |
| NO DISCOUNT ("NO AWARD")<br>Byte 51 packed/59 unpacked | Action | Indicates that no discount (or in the case of Frequent Flyers, no award redemption) applies for the specified passenger/itinerary that matches the table. |
| FARE CALCULATION | | |
| MINIMUM MILEAGE<br>Byte 52-56 packed/60-64 unpacked | Match | Indicates the minimum mileage of the fare component required to match the Record 3 data. Validates against the TPMs of the flight segments applicable to a particular fare component in the itinerary found in the query. |
| MAXIMUM MILEAGE<br>Byte 57-61 packed/65-69 unpacked | Match | Indicates the maximum mileage of the fare component required to match the Record 3 data. Validates against the TPMs of the flight segments applicable to a particular fare component in the itinerary found in the query. |
| FARE CALCULATION FORMULA INDICATOR<br>Byte 62 packed/70 unpacked | Action | Indicates whether the fare is to be calculated, specified or computed using both calculated and specified amounts. Frequent Flyer Award Redemptions will normally be "S" - Specified. |

TABLE 18-continued

| Category 25 Record 3 Byte Location | Match/Action | Definition/Processing |
|---|---|---|
| | | "A" can be used for award redemptions that provide discounts off of published fares upon payment of a specified number of miles; i.e. the fare will be calculated by applying data in the PERCENT field below against Base Fare information in Table 989. Then the resulting amount of the Calculated fare will be in addition to the Specified amount of required mileage. |
| PERCENT Bytes 63-66 packed/71-77 unpacked | Action | Indicates the percentage to be applied to the base fare. This can be used to provide for award redemption programs that provide percent discounts upon "payment" of mileage. |
| SPECIFIED FARE NO. 1 Bytes 67-70 packed/78-86 unpacked | Action | Indicates a specified fare amount to be charged. For Frequent Flyer Award Redemptions, the amount/cost will be expressed in earned mileages. To conform to the majority of Frequent Flyer award offerings, the cost in miles refers to the whole Pricing Unit, not per fare component. 000000000-999999999 |
| CURRENCY 1 Bytes 71-73 packed/87-89 unpacked | Action | Currency code of the fare amount above. For Frequent Flyer Award Redemptions, a convention or unique currency code can be established to indicate "Miles" in lieu of a currency. |
| DECIMAL Byte 74 packed/90 unpacked | Action | Decimal placement for the currency. For Frequent Flyer Award Redemptions, typically "0". |
| SPECIFIED FARE NO. 2 Bytes 75-78 packed/91-99 unpacked | Action | Indicates a second specified fare amount, or co-payment. For Frequent Flyer Award Redemptions, this "second" amount is used for awards that involve mileage redemption plus a fee or co-payment. Such fee or co-payment is coded here. It is processed as an AND relationship with Specified Fare No. 1. |
| CURRENCY 2 Bytes 79-81 packed/100-102 unpacked | Action | Currency code of the above fare amount. |
| DECIMAL Byte 82 packed/103 unpacked | Action | Decimal placement for a secondary currency. |
| MILEAGE PURCHASE OPTION fields (these fields are used in a non-ATPCO data structure only; they are filler in ATP compliant product): (ATP filler Bytes 83-96 packed/104-118 unpacked) | | |
| PERMITTED DEFICIT | Match/Action | Indicates up to what percentage difference can be purchased, the difference being between the number of miles required for the mileage award and the number of mileage credit available. 00-100 |
| MINIMUM BALANCE | Match/Action | Indicates the minimum amount of earned miles necessary to qualify for the purchase of additional miles. |
| NUMBER OF MILES | Action | Formula for paying the Mileage deficit to make up for a shortfall in the number of miles earned applied against the number of miles required to purchase an award. 00001-99999 |
| PURCHASE RATE | Action | The amount represents the Rate Per Number of miles shown above. |
| CURRENCY | Action | Currency code of the above fare amount. |
| DECIMAL | Action | Decimal placement. |
| FARE COMPARISION: | | |
| FARE RANGE 1 - MIN FARE Bytes 97-100 packed/119-127 unpacked | Action | Need not be used for Frequent Flyer Award Redemption FBRs. |
| FARE RANGE 1 - MAX FARE Bytes 101-104 packed/128-136 unpacked | Action | Need not be used for Frequent Flyer Award Redemption FBRs. |
| FARE RANGE 2 - MIN FARE Bytes 109-112 packed/141-149 unpacked | Action | Need not be used for Frequent Flyer Award Redemption FBRs. |
| FARE RANGE 2 - MAX FARE Bytes 113-116 packed/150-158 unpacked | Action | For Frequent Flyer Award Redemption FBRs, can be used to cap percent discounts off of base fares for a maximum flat amount off. |
| RULES TARIFF NUMBER Bytes 121-122 packed/159-161 unpacked | Action | Need not be used for Frequent Flyer Award Redemption FBRs. |
| CARRIER CODE Bytes 123-125 packed/166-168 unpacked | Action | Need not be used for Frequent Flyer Award Redemption FBRs. |

TABLE 18-continued

| Category 25 Record 3 Byte Location | Match/ Action | Definition/Processing |
|---|---|---|
| FARE CLASS Bytes 126-133 packed/169-176 unpacked | Action | Need not be used for Frequent Flyer Award Redemption FBRs. |
| FARE TYPE Bytes 134-136 packed/177-179 unpacked | Action | Need not be used for Frequent Flyer Award Redemption FBRs. |
| RESERVED Bytes 137-147 packed/180-190 unpacked | N/A | Filler |
| RESULTING FARE INFORMATION: | | |
| OW/RT Byte 148 packed/191 unpacked | Match/ Action | Indicates the one-way/round-trip value to be applied to the resulting fare/award produced in the Fare by Rule process.<br>1 = One-way<br>2 = Round-Trip |
| GLOBAL Bytes 149-150 packed/192-193 unpacked | Action | Indicates the global indicator to be applied to the resulting fare/award produced in the Fare by Rule process. In some examples, only IATA Global Indicators are valid. |
| ROUTING TARIFF Bytes 151-152 packed/194-196 unpacked | Action | Indicates the routing tariff holding the routing number to be applied to the resulting fare/award produced in the Fare by Rule process. |
| ROUTING NUMBER Bytes 153-155 packed/197-201 unpacked | Action | Indicates the routing number to be applied to the resulting fare/award produced in the Fare by Rule process.<br>00000 = mpm<br>77777 = Any valid routing or MPM<br>88888 = Any valid Routing<br>99999 = Base Fare Routing Tariff applies. For Frequent Flyer Award Redemptions which are specified and do not have a base fare, this value or another can be established to indicate "No Routing Validation" |
| RESERVED Bytes 156-160 packed/202-206 unpacked | N/A | (filler) |
| FARE CLASS Bytes 161-168 packed/207-214 unpacked | Match/ Action | The fare class code of the resulting fare/award produced in the Fare by Rule process. For Frequent Flyer Award Redemptions, this field houses the Award Code. |
| FARE TYPE Bytes 169-171 packed/215-217 unpacked | Match/ Action | Indicates the fare type code and cabin of the resulting fare/award. |
| SEASON TYPE Byte 172 packed/218 unpacked | Match/ Action | Indicates the season type code of the resulting fare |
| DAY CATEGORY Byte 173 packed/219 unpacked | Match/ Action | Indicates the day of the week type code of the resulting fare/award. |
| DISPLAY CATEGORY Byte 174 packed/220 unpacked | Action | Indicates the display category type of the resulting fare/award. |
| PRICING CATEGORY Byte 175 packed/221 unpacked | Action | Indicates the pricing category type of the resulting fare/award. |
| PRIME RBD Bytes 176-191 packed/222-237 unpacked | Action | Indicates up to 8 Prime RBDs of the resulting fare/award. |
| RBD TABLE 999 Bytes 192-194 packed/238-245 unpacked | Action | Indicates the RBD exception data of the resulting fare/award. |
| RESERVED Bytes 195-200 packed/246-251 unpacked | N/A | (filler) |
| TICKETING CODE Bytes 201-210 packed/252-261 unpacked | Action | Indicates the ticketing code to be used on the ticket instead of the resulting fare class. |
| TICKETING CODE MODIFIER Byte 211 packed/262 unpacked | Action | Indicates that the maximum stay, minimum group size, or percentage of discount to be appended to the ticketing code |
| TICKET DESIGNATOR Bytes 212-221 packed/262-272 unpacked | Action | Indicates the ticket designator to be appended to the resulting award code preceded by "/". |
| TICKET DESIGNATOR MODIFIER TAG Byte 222 packed/273 unpacked | Action | Indicates that the maximum stay, minimum group size or percentage of discount is to be appended to the end of the ticket designator preceded by "/". |

TABLE 18-continued

| Category 25 Record 3 Byte Location | Match/ Action | Definition/Processing |
|---|---|---|
| CATEGORY OVERRIDE TAGS | | |
| CATEGORY 1-50 (Except 25) OVERRIDE TAGS Byte 223-271 packed/274-322 unpacked | Action | Indicates whether the Fare by Rule and/or Base Fare categories apply to the Fare by Rule being produced. |
| HIGHEST TAG Byte 272 packed/323 unpacked | Action | Indicates the order of applying Resulting Fares after all calculations and validation criteria have been met. (Need not be used to Frequent Flyer Award Redemption FBRs.) |
| OVERRIDE DATE TABLE Byte 273-275 packed/324-339 unpacked | Match | Refers to a number that defines reservation, ticketing, and/or travel dates to which the discount applies. The Override Date Table data matches the reservation, ticketing, and/or travel dates of the pricing solution for the award to be applied. |
| TEXT TABLE Byte 276-278 packed/332-339 unpacked | Action | Refers to a table containing free-form text regarding Category 25. |
| BASE FARE TABLE Byte 279-281 packed/340-347 unpacked | Action | Refers to a 989 table containing Base Fare information. Used for Frequent Flyer Award Redemption FBRs that offer a percent discount off of published fares upon payment of a specified number of earned miles. |
| UNAVAILABLE DATA TAG Byte 282 packed/348 unpacked | Action | Indicator that this fare cannot be used for auto-pricing or that this Record 3 contains only free-form text. |

Prior to processing Category 25 Record 3 tables, a Record 2 for Category 25 is matched in order to determine the correct Record 3 provisions for the fare/award. After a match is made to Record 2, processing attempts to match Category 25 Record 3 table(s) housed in the matching Record 2, based on the Record 3 match fields. The following are Record 3 match fields that can be used for frequent flyer award redemptions: passenger type code (PTC), passenger status information, travel wholly within, number of flight segments, mileage of the fare component, fare type (match/action field), and override date table no. 994. If processing cannot match all of the match fields, then the system will "no match" the Record 3 and continue processing to the next Record 3 table.

Once a match is made, the data can be processed as follows:
  a) Processing stops when the no discount (byte 51) field has a value X. Processing does not continue to another Record 3 table within the string.
  b) Processing produces a specified fare by rule. All data for producing the fare is contained with the Category 25 Record 3.
  c) Processing can also produce a calculated discount off of published base fares (upon payment of a specified amount of earned miles).

After Category 25 is processed, rule conditions are validated. Matching fare by rule category data, for any category, is based on the data in the Category 25 resulting fare fields. For specified FBRs, rule validation applies the fare by rule fare rule and general rule category data. Rules for calculated FBRs are taken from either the base fare, the FBR categories, or in some cases both are applied depending on the way the category override tags are set.

The reservation booking designator (RBD) data is validated. For specified fare by rules, RBD data can be found in the resulting fare fields (prime RBD and table 999 booking code exceptions). It is not anticipated that RBD Record 6 Chart 1 would need to be interrogated, however, based on customer preference/configuration, this processing logic could be added. Also, again based on customer preference/configuration, Mixed Class of Service table will be used as long as at least one of the carrier's flights has been validated by the Prime or Table 999 exceptions. Record 6, Chart 2 will not be interrogated. Note that the Prime refers only to the carrier owning the award program. The partners' RBDs will be coded in Table 999. Unresolved partner flight segments will not validate against the prime.

Category 10 data is validated next to determine if there are permissible award combinations.

If processing passes validation of all of the above criteria, then the resulting fare/award passes. Processing continues to another Category 25 Record 3 table. If processing does not pass validation of all of the above criteria, the resulting fare fails and processing continues to attempt to pass another possible resulting fare (for calculated discounts off of multiple base fares), and/or moves on to another Category 25 Record 3 table.

There are also exceptions to the fare by rule processing of strings of Record 3 tables. One exception is that Record 3 for Category 25 is used as a main category and not as an IF condition. Another exception is that edits prevent AND tables for Category 25. Another exception is that when processing matches, a Record 3 with the no discount (byte 51) field having value X, indicates that a fare by rule cannot be produced according to the table. Processing will not continue to another Record 3. Another exception is that when processing matches a Record 3, processing produces the award according to the table, and processing continues to another table (including OR tables) attempting to match and produce another fare (unless byte 51 is value X). Another exception is that after processing matches the IF THEN set, whether pass of fail, processing continues to another set in the string, attempting to match and produce another fare (unless byte 51 is value X). General rules are not permitted for Category 25. However, general rules can be referenced in any Category in the fare by rule other than Category 25.

Referring to the fields in the example in Table 18, for frequent flyer award redemptions, the passenger type code (PTC) identifies the frequent flyer passenger eligible for the award being produced. Data in this PTC field matches to the primary PTC in Record 8. The normal PTC mapping hierarchy does not apply but there will be mapping of specific frequent flyer PTCs requested in the query to general frequent flyer PTCs coded. Furthermore, specific Frequent Flyer PTCs are allowed under general Frequent Flyer PTCs in the Record 8, and will match to the specific Frequent Flyer PTC referenced in the query. If the PTC in Category 25 matches/maps to the primary PTC in Record 8, processing produces the fare according to the data in the Category 25 table (provided a match is also made to all other Category 25 match fields). The passenger status fields define the status and any geographic restrictions for the passenger specified in the PTC field. These fields include the application field (APPLICATION), the passenger status field (STATUS), and the geographic specification fields (TYPE, LOC). These fields are described above in connection with the Record 8 example of Table 6, where they also reside.

When data is present in travel wholly within fields (TRAVEL WHOLLY WITHIN-TYPE, TRAVEL WHOLLY WITHIN-LOC) all points of travel on the fare component must be within the specified location. This geographic data may be expressed as an area, zone, nation, or state. The passenger travel origin fields refer to origin of journey and do not have to be used for frequent flyer award redemptions. The number of flight segments field identifies the maximum number of flight segments (coupons) per pricing unit that can be used for the resulting fare/award data.

The override date table identifies a table containing dates on which travel, ticketing, and/or reservations are valid for the data in this category. When present, the table further defines the specific date range within effective/discontinue dates of the Record 2. When validating travel override dates in table 994, validation is against the departure date of the first flight of the fare component being validated.

Once processing matches all match fields in the Record 3, processing interrogates the data in the no discount field. This field is used to specify that the FBR does not apply for the matched passenger itinerary. If processing matches the table and the no discount field is value Blank, then the fare/award is produced according to the remainder of the Category 25 data. Processing also continues to other Record 3 tables in the string. As described above, if processing matches the table and byte 51 is value X, then no discount/award is permitted. Processing does not continue to another Record 3 table in the string. If processing "no matches" the table, processing continues to another table (regardless of the value in the no discount field).

Once a match is made to the Record 3, processing produces the fare based on the fare calculation fields. The fare calculation fields can include mileage fields (MINIMUM MILEAGE, MAXIMUM MILEAGE), a fare calculation indicator field (FARE CALCULATION FORMULA INDICATOR), a percent field (PERCENT) and fare 1/fare 2 fields (SPECIFIED FARE NO. 1/2, CURRENCY 1/2, DECIMAL).

The minimum/maximum mileage fields specify the minimum/maximum mileage permitted for the fare component/award being produced in order to match the table. Validation of the mileage data is against the mileage of the fare /award being produced. Processing identifies the origin and destination of the fare component being produced and determines the mileage between these points. Mileage is calculated as the TPM for the origin and destination of the fare component ignoring any/all interchange and intermediate travel points. If no TPM exists for the origin and destination of the fare component, then great circle mileage would be calculated for all intermediate ticketed points. These mileage fields may have a value 00000 through 99999, signifying a specified number of miles. Tables 19 and 20 illustrate an example.

TABLE 19

| | THEN Category 25 Record 3 | | |
|---|---|---|---|
| PTC Bytes 8-10 | Mileage - Min Bytes 52-56 | Mileage - Max Bytes 57-61 | Fare Calculation |
| FFY | 00000 | 01200 | 10,000 MLG |

TABLE 20

| | OR Category 25 Record 3 | | |
|---|---|---|---|
| PTC Bytes 8-10 | Mileage - Min Bytes 52-56 | Mileage - Max Bytes 57-61 | Fare Calculation |
| FFY | 01201 | 99999 | 15,000 MLG |

The data in Table 19 indicates that if the itinerary is for a frequent flyer and the one-way mileage of the award being produced is less than or equal to 1200 miles, then 10,000 earned miles will be charged. While, Table 20 indicates that if the mileage is greater than or equal to 1201 miles and less than or equal to 99999 miles, then the award costs 15,000 miles.

The fare calculation indicator field indicates the fare calculation formula to be used in the production of the fare by rule. A value of "C" is used to calculate fares off of a base fare, but typically is not used for award redemptions. Instead, "A" can be used for award redemptions that provide discounts off of published fares upon payment of a specified number of miles (i.e. the fare will be calculated by applying data in the PERCENT field against base fare information in table 989). In this scenario, the resulting amount of the calculated fare is in addition to the specified amount of required mileage. This is a unique convention established for frequent flyer award redemptions.

The most common value for award redemptions will be Value "S"—Specified. In such cases, the cost in mileage is coded in Fare 1, and if there is a co-payment, Fare 2 can be coded. This convention is also unique to frequent flyer award redemption FBRs. The resulting fare OW/RT field can specify whether the award redemption is an OW (one way) or a RT (round trip) award.

The percent field may be used for frequent flyer award redemptions that require mileage to obtain a percent discount off of a base fare.

For Frequent Flyer Award Redemption FBRs, the fare 1/fare 2 fields are used to express the earned mileage required to obtain the award, and additional co-pay amounts, when applicable. Each fare field specifies a fare amount, currency, and decimal place(s) in the amount. The fare 1 fields can be used for earned mileage, and the fare 2 fields can be used for co-payments. As such, the relationship between the fields is "And". This convention is also unique to frequent flyer award redemption FBRs. Table 21 illustrates of an encoded award that requires both the redemption of miles and a co-payment.

TABLE 21

| F/Ind Byte 62 | Percent Bytes 63-66 | Fare 1 Bytes 67-74 | Fare 2 Bytes 75-82 | OW/ RT Byte 148 | Comments |
|---|---|---|---|---|---|
| S | 000.0000 | 20,000 MLG | 150.00 USD (i.e. 15000 decimal placement 2) | 2 | The award being produced requires that 20,000 miles be relinquished and |

TABLE 21-continued

| F/Ind Byte 62 | Percent Bytes 63-66 | Fare 1 Bytes 67-74 | Fare 2 Bytes 75-82 | OW/ RT Byte 148 | Comments |
|---|---|---|---|---|---|
| | | | | | that a co-payment of USD 150.00 is required. |

Figure 8A:
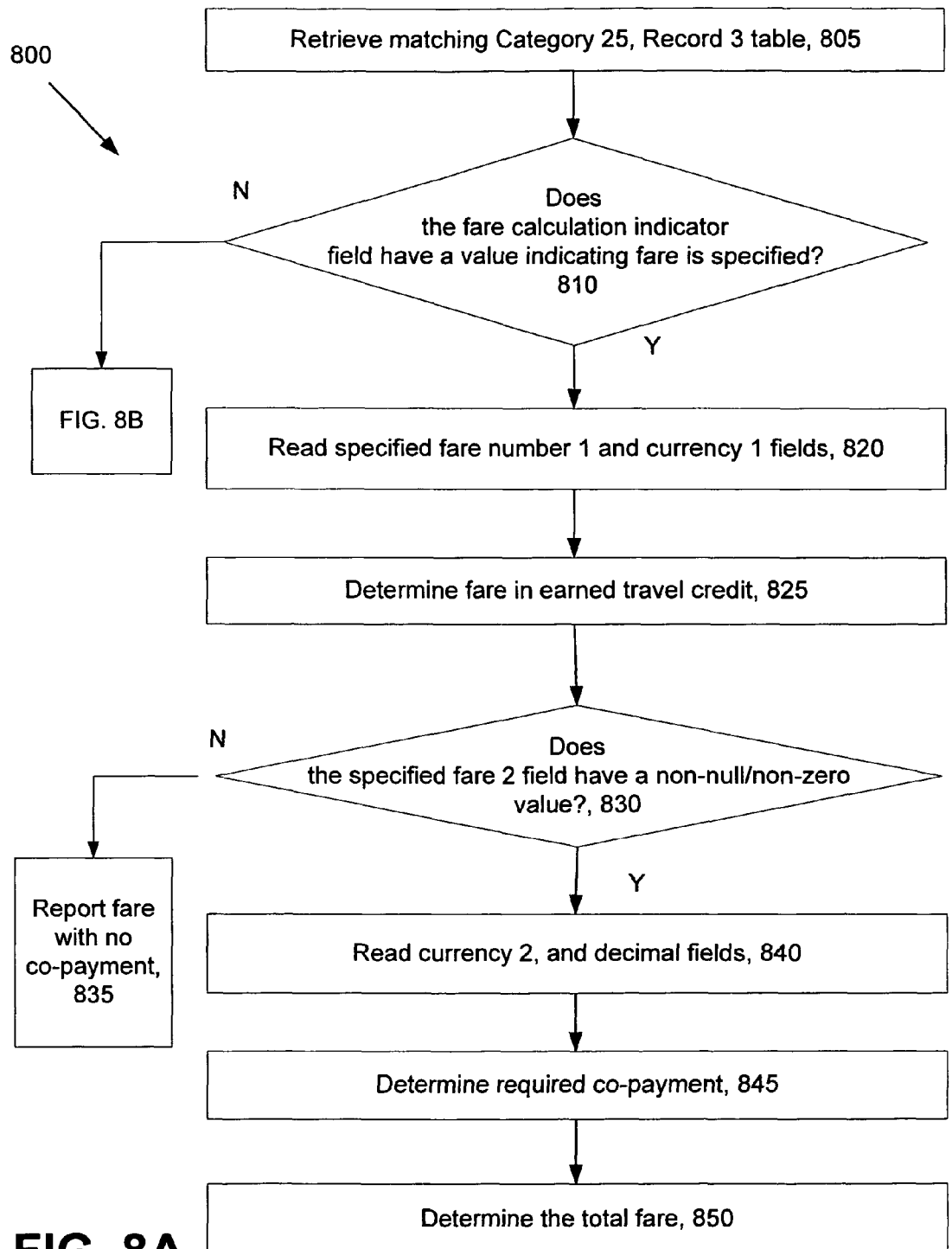
FIGS. 8A and 8B are flow charts of a process to determine a co-payment for a frequent traveler award redemption.

Referring to FIG. 8A, process 800 illustrates a calculation of a fare, in earned travel credit and a co-payment in currency. For an illustrative example, the description of process 800 uses the values shown in Table 21. Process 800 retrieves (805) a Category 25, Record 3 table and reads the value of the fare calculation formula indicator field (e.g., byte 62 (packed) or byte 70 (unpacked) for an ATPCO data structure). If the value does not indicate that the fare is specified (e.g., the value is "A"), the process 800 performs the processing (815) shown in FIG. 8B, and it the processing in FIG. 8B does not find the value, the process ends and another fare calculation process is performed (see e.g., the fare calculation formula indicator field in Table 18 and its accompanying description).

If the value does indicate that the fare is specified (e.g., the value is "S"), the process 800 reads the specified Fare no. 1 field (e.g., bytes 67-70 (packed) or bytes 78-86 (unpacked) for an ATPCO data structure) and the Currency 1 field (e.g., bytes 71-73 (packed) or bytes 87-89 (unpacked) for an ATPCO data structure).

Using the values shown in Table 21, the value of the specified fare 1 field is 20000 and the value of the currency field is MLG, to represent that the earned credit fare is in terms of earned mileage. In some examples, process 800 also reads the decimal field (e.g., byte 74 (packed) or byte 90 (unpacked) for an ATPCO data structure) for Fare 1, which typically would be zero unless the earned travel credit was not represented in whole integer units, and apply the value by placing the decimal point where indicated in the specified Fare 1. By combing the fields that process 800 read (820), process 800 determines (825) that the fare, in earned travel credit, is 20,000 miles.

Process 800 reads the specified Fare no. 2 field (e.g., bytes 75-78 (packed) or bytes 91-99 (unpacked) for an ATPCO data structure) to determine if the field has a non-null or non-zero value. If the value is null or zero, then there is no co-payment necessary and process 800 can report the fare in terms of the earned travel credit (e.g., 20,000 miles). If the value is non-null or non-zero, then process 800 determines the co-payment. In addition to the specified fare no. 2 field, process 800 reads (840) the currency 2 field (e.g., bytes 79-81 (packed) or bytes 100-102 (unpacked) for an ATPCO data structure) and the decimal field (e.g., byte 82 (packed) or byte 103 (unpacked) for an ATPCO data structure) for fare 2.

Using the values shown in Table 21, the value of the specified fare 2 field is 15000 and the value of the currency field is USD, to represent that the fare co-payment is in terms of US dollars. The value of the decimal field is 2, representing the placement of the decimal point two places from the end of the specified fare number. By combing the fields that process 800 read (840), process 800 determines (845) that the co-payment, in US dollars, is $150.00.

To determine (850) the total fare, process 800 treats the determined earned travel credit fare (825) and the determined co-payment (845) as an "AND" relationship. This is different from the standard ATPCO processing, which uses the specified fares in a different way, and treats them as an "OR" relationship. Using the values shown in Table 21, process 800 determines (850) that the total fare is 20,000 miles and a co-payment of $150.00 US dollars.

As described in Table 18, in a non-ATPCO data structure, some of the filler bytes can be changed into fields that define purchase options for travel award credit, should a user not have enough earned travel award credit for a particular travel option. These fields can include permitted deficit/minimum balance fields, a number of miles field, a purchase rate field, a currency field, and a decimal field. The permitted deficit match field indicates up to what percentage difference between the number of miles required for the mileage award and the number of miles available can be purchased, while the minimum balance field indicates the minimum number of earned miles required to purchase additional miles. Although miles are used here for illustration, other earned travel award credit units (e.g., nights spent, number of trips, etc.) are equally applicable to other frequent award programs involving redemption rules to produce an allowable itinerary, such as hotel and rental car reservations.

For example, the percentage can express the number of miles earned applied against the number of miles required to purchase an award. The number of miles action field provides the "per miles" portion of the formula (e.g., the rate) for paying the mileage deficit to make up for a shortfall in the number of miles earned applied against the number of miles required to purchase an award. The value of this field can be 00001-99999. The purchase rate action field provides an amount representing the rate per number of miles shown above. For example, the purchase rate can be "0.15 USD" per mile, or "20.00 USD per block of 100 miles." The currency field indicates the currency code of the above amount. The decimal field indicates the decimal placement.

Figure 8B:
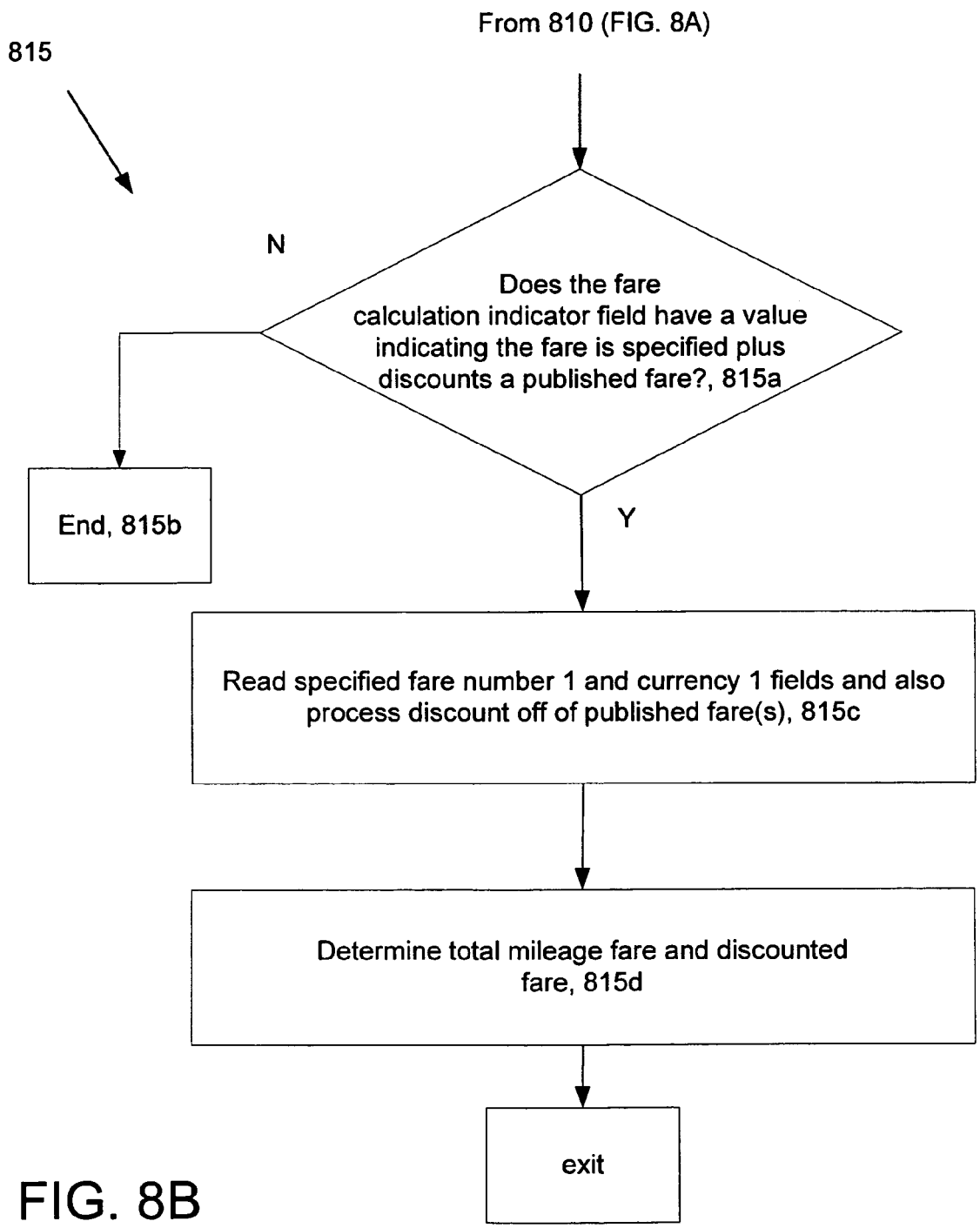

Referring to FIG. 8B, the processing 815 determines if the fare calculation indicator field has a value indicating the fare is specified plus discounts a published fare, 815*a*. If not the process ends 815*b*. If it does the process 815, reads a specified fare number 1 and currency 1 fields and also processes discounts off of published fare(s), 815*c*. The process then determines the total mileage fare and discounted fare, 815*d* and exits.

Figure 9:
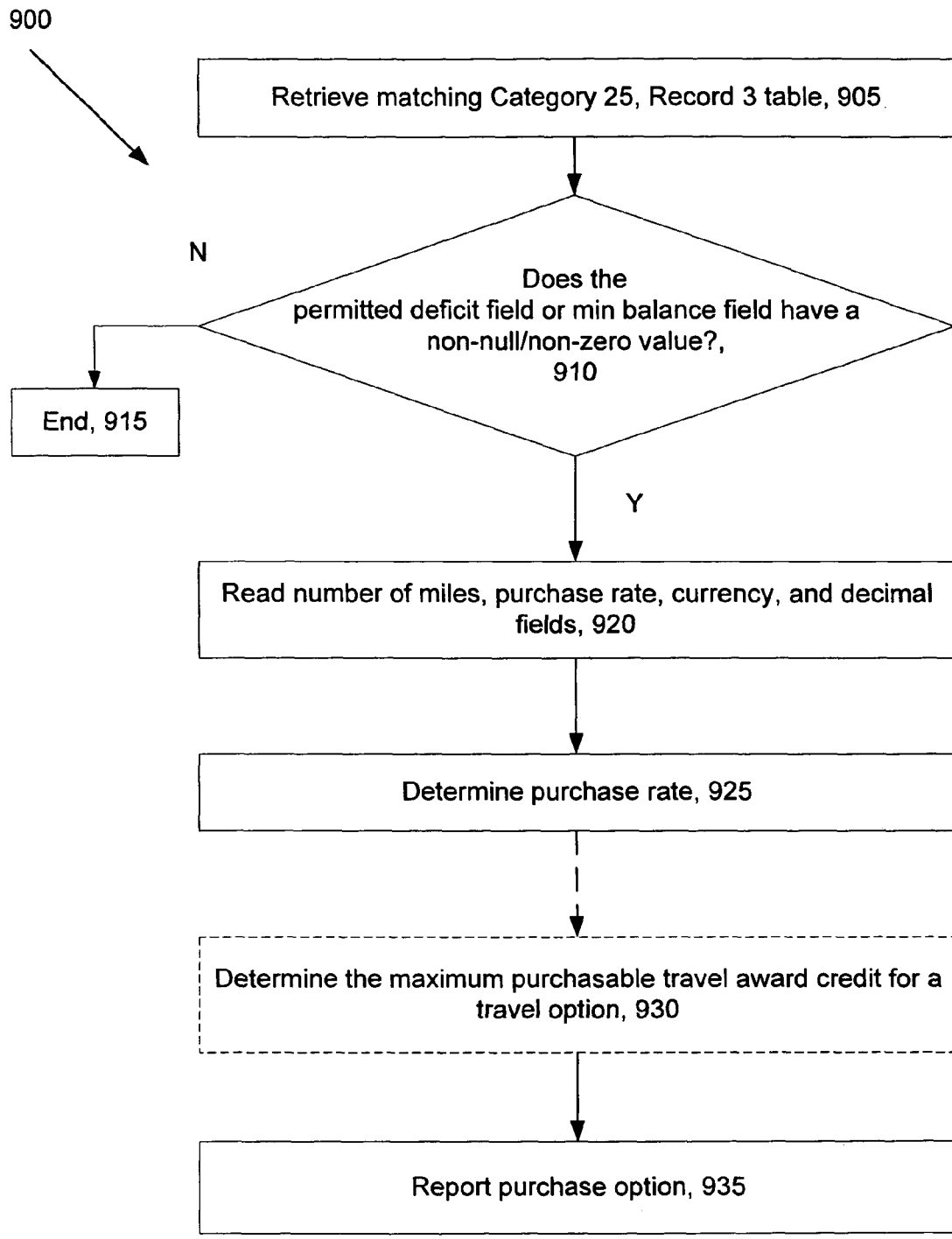
FIG. 9 is a flow chart of a process to determine purchasable travel award credit for a frequent traveler award redemption.

Referring to FIG. 9, process 900 illustrates a calculation of purchasable travel award credit. Process 900 retrieves (805) a Category 25, Record 3 table and reads the permitted deficit field (e.g., located within filler bytes 83-96 (packed) or bytes 104-118 (unpacked) for a modified ATPCO data structure) to determine (910) if the field has a non-null or non-zero value. If the value is null or zero, then there is no purchasable travel credit option and process 900 ends (915). If the value is non-null or non-zero, then process 900 determines the purchase rate. Process 900 reads (920) the number of miles field, the purchase rate field, the currency field, and the decimal field (e.g., all of which can be located within filler bytes 83-96 (packed) or bytes 104-118 (unpacked) for a modified ATPCO data structure). Using the value in these fields, process 900 determines (925) the purchase rate for the purchasable travel award credit.

For an illustrative example, the value for the number of miles field can be 100, the value for the purchase rate field can be 2000, the value for the currency field can be, e.g., United States Dollars (USD) or other suitable currency, and the value for the decimal field can be 2. By combining these values, process 900 determines that the rate is 20.00 US dollars for each 100 miles. Process 900 can report (930) this rate to the user, along with the maximum percentage of miles that can be purchased. The maximum amount is determined using the value in the permitted deficit field. For example, if the value is 05, then process 900 reports to the user that 5% of the travel award credit can be purchased for the rate identified (e.g., $20.00 US per 100 miles).

Process 900 can also optionally determine (935) the maximum amount of purchasable travel award credit for a particular travel option and present it in terms of travel award credit. For example, if an award redemption for a particular travel option is 20,000 miles, process 900 can also provide to the fare (i.e., 20,000 miles) with an option that up to 1000 of those miles can be purchased (e.g., using the 05 value of permitted deficit) for the rate identified (e.g., $20.00 US per 100 miles).

Another way to present this to the user is to list all of the possible purchase options (e.g., determined by the value in the number of miles field) as separate travel options. For example, using the 20,000 miles fare and the $20.00 US per 100 miles rate, in addition to a travel option showing a fare of 20,000 miles, there would be 10 additional travel options with the same itinerary, but different mileage requirements and co-payments. For example, there would be one travel option with a fare of 19,000 miles and a $200.00 US co-payment, another travel option (e.g., same itinerary) with a fare of 19,100 miles and a $180.00 US co-payment, another travel option with a fare of 19,200 miles and a $160.00 US co-payment, and so on. If process 900 knows the actual deficit (e.g., the number of earned travel credit awarded to the particular user is included in the query or obtained from another accessible database on the network (e.g., 140)), then process 900 can limit the travel options to those that correspond to the actual deficit.

Table 18 also includes a grouping of fare comparison fields. These fields identify a fare range or a specific fare that should be retrieved to be used for comparison to the resulting fare. The FARE RANGE 2—MAX FARE can be used to cap percent discounts at a designated amount. For instance, when an award includes a percent discount of a published fare (i.e. the base fare) the maximum amount of the discount can be capped as indicated in this field.

Table 18 also includes a grouping of fields labeled as resulting fare information. Since the fare by rule has no associated fare record or Record 1, the resulting fare information fields exist in the Record 3 for Category 25 in order to build a fare/award and hold the information that would normally be held in the fare and/or Record 1. The resulting fare fields can include the following: a OW/RT field, a global field, a routing tariff field, a routing number field, a fare class field, a fare type field, a season type field, a day category field, a display category field, a pricing category field, a prime RBD field, a RBD Table 999 field, a ticketing code field, a ticketing code modifier field, a ticket designator field, and a ticket designator modifier tag field.

Processing uses data in the resulting fare fields for matching and validating fare by rule Record 2s and Record 3s for other categories coded in the FBR. When the fare calculation indicator field has a value S (Specified Fare), edits require that the following resulting fare fields be coded: OW/RT, routing number, fare class code, fare type, display category, pricing category, and prime RBD.

The OW/RT field specifies whether the resulting fare is a one way or round trip fare. There are three values that can be encoded into this field. A value of 1 indicates the reward is applicable to a one-way fare that may be doubled (Tag 1). A value of 2 indicates the reward is applicable to a round trip fare (Tag 2). A value of 3 indicates the reward is applicable to a one-way fare that may not be doubled (Tag 3).

The GLOBAL INDICATOR field specifies the global indicator of the resulting fare. Processing validates the specified global indicator against the route of travel in order to pass the fare/award being produced. Only IATA global indicators are valid. A global indicator may be present with or without data in the routing tariff and/or routing number fields.

The routing tariff field specifies the ATPCO routing tariff of the routing number for the resulting fare. The routing tariff may be a fare by rule routing tariff or a published fare routing tariff. Edits require data in routing tariff when routing number is a value between 00001-09999 (specified routing number). Currently, when the routing number field has a value of 00000 (apply MPM), a value of 77777 (any routing or MPM), a value of 88888 (any routing), or a value of 99999 (no application), ATPCO edits require that routing tariff be value 000 (no application). In the non-ATPCO data structures, values 77777 and 88888 can be associated with a routing tariff number in this field.

The routing number field specifies the routing number for the resulting fare. Processing validates the specified routing tariff and number in order to pass the fare by rule producion. Edits require data in routing number when the fare calculation indicator field has a value S (specified). For frequent flyer award redemption FBRs, a different value (e.g., 900 and/or 910) is included to indicate that no routing validation is required.

As described above, particular values of the routing number field can have a certain significance. The value range of 00001-09999 indicates a specified routing. Specified routings refer to the routings of the carrier owning the program. A value of 00000 indicates that the maximum permitted mileage (MPM) published by IATA applies for the routing validation of the resulting fare. A value of 77777 indicates that the resulting fare may pass routing validation based on any routing in the market for the participating carrier or based on the MPM for the market. A value of 88888 indicates that the resulting fare may pass routing validation based on any routing in the market for the Category 25 Record 2 carrier. When multiple partners participate in an award ("interline awards") via Routing 77777 or 88888, the system will validate the routings for each carrier applicable on the portion of travel being flown by that carrier. A value of 99999 indicates that the routing number of the base fare applies to the resulting fare. Since there will be no base fare comparisons for specified frequent flyer award redemption FBRs, either this value of 99999, or another value (e.g., routing 900 and 910) can be established to indicate that no routing validation takes place.

For frequent flyer award redemption FBRs, the FARE CLASS field specifies the award code of the award redemption being produced. The award code in this field is also used later to match/validate Record 2s and Record 3s for the other categories in the FBR and other processing of the fare produced from the fare by rule, such as RBD validation.

The FARE TYPE, SEASON, DAY OF WEEK fields specify the fare type code, season code, and day of week code for the resulting fare. Data in these fields is used to match/validate fare by rule Record 2s and 3s and for all future processing of the fare produced from the fare by rule process. Edits require data in the fare type field when the fare calculation indicator field has a value S (specified). In addition, fare type also identifies a cabin class. When a query requests awards in a particular cabin, it is validated against this field, however, if unique Fare Type codes are not assigned to awards in different cabins, then a Booking Code hierarchy that is broken down by cabin can be produced. The DISPLAY CATEGORY field specifies the display category type for the resulting fare. Data in this field is used for future processing of the fare produced from the fare by rule process. Edits require data in the display category field when fare calculation indicator field has a value S (specified). Frequent flyer award redemptions can also include unique values of a display category code.

The PRICING CATEGORY field specifies the pricing category (e.g., normal/special) for the resulting fare. ATPCO edits require data in the pricing category field when fare calculation indicator field has a value S (specified). This field can be option for frequent flyer award redemptions, and therefore, does not have to be included in the non-ATPCO data structures.

The PRIME RBD and RBD TABLE 999 fields specify the prime RBD(s) and/or RBD table 999 booking code exception data for the resulting fare/award. Data in these fields is used for RBD validation of the resulting fare/award. In addition to RBD validation, a mixed class of service table may be used to validate flight segments that remain unqualified after RBD validation.

The value in the TICKETING CODE field replaces or alters the fare class code/award on the ticket. When a ticketing code is entered with a hyphen preceding it, the information is appended to the end of the resulting fare class code/award. The ticketing code modifier field indicates the type of rule information that should be appended to the resulting fare class code/award on the ticket.

The value in the TICKET DESIGNATOR field is appended to the end of the resulting fare class code/award using the convention of '/' followed by the ticket designator information. The ticket designator modifier (TDM) field is used to indicate that additional information should be appended to ticket designator.

Table 18 also includes a grouping of fields labeled as CATEGORY OVERRIDE tags. These fields indicate whether the rules of the base fare or the new fare being produced apply. Typically, for specified FBRs, including the frequent flyer award redemptions, the category override tags will be blank. For calculated frequent flyer award redemptions (e.g., mileage plus a percent discount), these fields can be used in the same manner as other calculated FBRs.

The following two examples provide further illustration of how process 120 can be used.

EXAMPLE 1

TABLE 22

| | |
|---|---|
| DEPARTURE DATE/TIME | Nov. 28, 2004 |
| ORIGIN DEPARTURE | BOS |
| DESTINATION | DUB |
| CONTINUING DATE/TIME | Dec. 05, 2004 |
| CONTINUING DEPARTURE | DUB |
| FINAL DESTINATION | LON |
| CARRIER(S) | EI BA |
| CABIN | Coach |
| PASSENGER TYPE | FFY |
| SALES CARRIER | AA |
| ACCOUNT CODE | FFAA |

Table 22 illustrates an example query. There may be several Records 8s that match to the query. One such match is shown below in Table 23. The match is to an example rule that can be added to hold, for example, AAdvantage "oneworld" awards only. The "oneworld" awards are valid on American Airlines, Aer Lingus, British Airways, Cathay Pacific Airways, Finnair, Iberia, LanChile and Qantas Airways.

The number of miles redeemed varies depending on the distance and class of service traveled. Oneworld award codes contain an "OW" for oneworld, the number of miles needed to claim the award (in thousands; for example '30' for 30,000 miles and a letter code for the cabin class, e.g. OW30Y.

TABLE 23

| Record 8 Field | Query Match/Action | Coding |
|---|---|---|
| CXR CODE | Match: SALES CARRIER AA | AA |
| | Action | Link to AA rules |
| PRIME PASSENGER TYPE CODE | Match: PASSENGER TYPE FFY | FFY |
| QUALIFYING ACCOUNT CODE | Match: ACCOUNT CODE FFAA | FFAA (Frequent Flyer Award Redemption) |
| TARIFF NUMBER | Action | 864 (FBRINPV) US/CA-Area 1/2/3 |
| RULE NO | Action | 5678 |
| JOINT CARRIER TABLE 997 | Match: PREFERRED CARRIERS EI BA | A number points to a table. Within that table, the following is coded: AA $, while interline partners EI BA CX AY IB LA QF, will be specified in Category 4. |
| GEO SCOPE: | | |
| LOC 1 TABLE 978 | Match: ORIGIN DEPARTURE BOS | A number will point to a table. Within that table, the following is coded: N: US N: CA |
| LOC 2 TABLE 978 | Match: FINAL DESTINATION LON | A number points to a table. Within that table, the following is coded: A: 2 A: 3 |

With the above information, it can be determined that there is a frequent flyer award redemption fare by rule that the passenger may qualify for given the query received. To further determine if the passenger is eligible, processing proceeds to the TRF/CXR/RUL indicated in the Record 8 above, and first searches for matching CATEGORY 25 Record 2s. Table 24 illustrates an example matching CATEGORY 25 Record 2.

TABLE 24

| Category 25 Record 2 Field | Match/Action | Coding |
|---|---|---|
| Rule Tariff | Match to the Rule Tariff in the Record 8 | 864 (FBRINPV) US/CA-Area 1/2/3 |
| Carrier Code | Match to the Carrier Code on the Record 8. | AA |
| Rule No | Match to the Rule Number on the Record 8. | 1234 |
| Sequence No | Action | 9000000 |
| Loc 1 Type | Match | N (nation) |
| Loc 1 Geo Spec | Match the Area/Zone/Nation/State/City to a point in the query market filtered through Record 8. | US |
| Loc 2 Type | Match | Z (zone) |
| Loc 2 | Match the Area/Zone/Nation/State/City to a point in the query market filtered through Record 8. | 210 (Europe) |
| Effective Date | Match | 030801 |
| Discontinue Date | Match | 9999999 |
| Relational Indicator | Action | THEN |
| Cat No | Action | '25'. |
| Record 3 Table No | Action | 3456543 |

Within the Record 2 sequence, the following Table 25 illustrates an example Record 3 that is a "match". With at least one match, the award redemption can be produced.

TABLE 25

| Category 25 Record 3 Fields | Match/Action | Definition/Processing |
|---|---|---|
| TABLE NO | Key Match | 3456543 |
| PASSENGER TYPE | Match | FFY |
| NUMBER OF FLIGHT SEGMENTS | Match | 99 (unlimited) |
| MINIMUM MILEAGE | Match | 1501 |
| MAXIMUM MILEAGE | Match | 4000 |
| FARE CALCULATION FORMULA INDICATOR | Action | S (Specified) |
| SPECIFIED FARE NO. 1 | Action | 35000 (earned miles) |

TABLE 25-continued

| Category 25 Record 3 Fields | Match/Action | Definition/Processing |
|---|---|---|
| CURRENCY 1 | Action | MLG ("miles" or similar coding convention to indicate miles instead of a currency amount) |
| DECIMAL | Action | 0 |
| RESULTING FARE INFORMATION | | |
| OW/RT | Match/Action | 3 (One-way that can not be doubled) |
| GLOBAL | Action | AT (via Atlantic) |
| ROUTING TARIFF | Action | 000 (no application) |
| ROUTING NUMBER | Action | 99998 (new value to convey that no routing validation takes place) |
| FARE CLASS | Action | OW35Y (oneworld Economy Class Award Code) |
| FARE TYPE | Match/Action | EAR (Economy Class/Cabin Award Redemption) |
| PRIME RBD | Action | T |
| RBD TABLE 999 | Action | VIA BA 'V' (Booking Code Exception for the portion via BA) |
| TICKET DESIGNATOR | Action | AVOW04 |

In addition to the award redemption is produced in Category 25, other categories hold the rest of the award conditions. For instance, Category 8—stopovers, can be coded with "unlimited" in accordance with this "oneworld" award, and validated accordingly.

EXAMPLE 2

TABLE 26

| DEPARTURE DATE/TIME | Mar. 28, 2004 |
|---|---|
| ORIGIN DEPARTURE | PHX |
| DESTINATION | BWI |
| CONTINUING DATE/TIME | Apr. 05, 2004 |
| CONTINUING DEPARTURE | BWI |
| FINAL DESTINATION | PHX |
| CARRIER(S) | HP |
| CABIN | COACH |
| PASSENGER TYPE | FFR |
| SALES CARRIER | HP |
| ACCOUNT CODE | FFHP02 |

Table 26 illustrates another example query. There may be several Records 8s that match to the query. One such match is shown below in Table 27. The match is to an example rule that can be added to hold coach awards only.

TABLE 27

| Record 8 Field | Query Match/Action | Coding |
|---|---|---|
| CXR CODE | Match: SALES CARRIER HP | HP |
| PRIME PASSENGER TYPE CODE | Match: PASSENGER TYPE FFY | FFY |
| QUALIFYING ACCOUNT CODE | Match: ACCOUNT CODE FFYAR | FFHP02 (Frequent Flyer Award Redemption) |
| TARIFF NUMBER | Action | FBRNAPV - 191 Within/between US/CA, between US/CA- PR/VI, Within PR/VI. |

TABLE 27-continued

| Record 8 Field | Query Match/Action | Coding |
|---|---|---|
| RULE NO | Action | 1234 |
| JOINT CARRIER TABLE 997 (Partner Carrier Table) | Match: CARRIER HP | The Joint Carrier Table lists HP and other domestic partner carriers, such as NW and GQ. (Or, absent a Joint Carrier Table, the system can default to the sales carrier HP) |
| GEO SCOPE: | | |
| LOC 1 Or User Defined Zone Table 978 | Match: ORIGIN DEPARTURE PHX | Z: 001 (Contiguous 48 states) |
| LOC 2 Or User Defined Zone Table 978 | Match: FINAL DESTINATION BWI | Z: 001 (Contiguous 48 states) |

With the above information, it can be determined that there is a Frequent Flyer award redemption Fare By Rule that the passenger may qualify for. To further determine if the passenger is eligible, processing proceeds to the TRF/CXR/RUL indicated in the Record 8 illustrated in Table 26, and first searches for matching CATEGORY 25 Record 2s. Table 28 illustrates an example matching CATEGORY 25 Record 2.

TABLE 28

| Category 25 Record 2 Field | Match/Action | Coding |
|---|---|---|
| Rule Tariff | Match to the Rule Tariff in the Record 8 | 191 (FBRNAPV) |
| Carrier Code | Match to the Carrier Code on the Record 8. | HP |
| Rule No | Match to the Rule Number on the Record 8. | 1234 |
| Sequence No | Action | 9000000 |
| Loc 1 Type | Match | Z (zone) |
| Loc 1 Geo Spec | Match the Area/Zone/Nation/State/City to a point in the query market filtered through Record 8. | 001 (The 48 contiguous United States and the District of Columbia) |
| Loc 2 Type | Match | Z (zone) |
| Loc 2 | Match the Area/Zone/Nation/State/City to a point in the query market filtered through Record 8. | 001 |
| JT CXR Table 997 | Match | (A table number pointing to a table coded as follows) HP NW GQ |
| Effective Date | Match | 030803 |
| Discontinue Date | Match | 9999999 |
| Relational Indicator | Action | THEN |
| Cat No | Action | '25'. |
| Record 3 Table No | Action | 3456543 |

Within the Record 2 sequence, the following Table 29 illustrates an example Record 3 that is a "match." For instance, the PTC matches, and the PHX-BWI flight segment(s) fall within the required mileage range and maximum number of flight segments. With at least one match, the award redemption can be produced.

TABLE 29

| Category 25 Record 3 Fields | Match/Action | Definition/Processing |
|---|---|---|
| TABLE NO | Key Match | 3456543 |
| PASSENGER TYPE | Match | FFY |
| NUMBER OF FLIGHT SEGMENTS | Match | 99 (unlimited) |
| MINIMUM MILEAGE | Match | 751 |
| MAXIMUM MILEAGE | Match | 9999 |
| FARE CALCULATION FORMULA INDICATOR | Action | S (Specified) |
| SPECIFIED FARE NO. 1 | Action | 25000 (earned miles) |
| CURRENCY 1 | Action | MLG ("miles" or similar coding convention to indicate miles instead of a currency amount) |
| DECIMAL | Action | 0 |
| RESULTING FARE INFORMATION | | |
| OW/RT | Match/Action | 2 (Round-Trip) |
| ROUTING TARIFF | Action | 099 (DRG1) |
| ROUTING NUMBER | Action | 002 |
| FARE CLASS | Action | CVLHUS (Coach Value Long Haul within the contiguous 48 states) |
| FARE TYPE | Match/Action | EAR (Economy Class/Cabin Award Redemption) |
| PRIME RBD | Action | T |
| TICKET DESIGNATOR | Action | FFLONG |

In addition to the award redemption is produced in Category 25, other categories can hold the rest of the award conditions. For instance, Category 11—blackouts, can hold blackout dates applicable to value awards.

The above-described techniques can be implemented in digital electronic circuitry, or in computer hardware, firmware, software, or in combinations of them. The implementation can be as a computer program product, i.e., a computer program tangibly embodied in a machine-readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods can be performed and apparatus can be implemented by one or more programmable processors executing a computer program to perform functions of the techniques described above by operating on input data and generating output. Methods can also be performed by, and apparatus can be implemented as, special purpose logic circuitry, e.g., an FPGA (field programmable gate array) or an ASIC (application-specific integrated circuit). Modules can refer to portions of the computer program and/or the processor/special purpose logic circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage devices suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other. Although a single client and a single server are shown in one example, the server can service multiple clients. Also, the processes described herein can be distributed over multiple servers.

The techniques above have been described using examples of particular embodiments. Other embodiments are within the scope of the following claims. The alternative examples are for illustration only and not to limit the alternatives in any way. The steps of the techniques described above can be performed in a different order and still achieve desirable results. The techniques described above can be applied to other frequent award programs involving redemption rules to produce an allowable itinerary, such as hotel and rental car reservations.

What is claimed is:

1. A method executed in a computer-based network comprising:
   receiving, by one or more computer systems, rules encoded in fare by rule data structures defined by a third-party non-airline carrier, said fare by rule data structures including rules for at least one frequent travel award redemption program, with the rules comprising fare rules that govern whether fares can be used with flights to provide travel itineraries and frequent travel award redemption program rules that govern redemption of award credits, the frequent travel award redemption program rules including fields to indicate a first fare amount expressed as award credit and a second fare amount expressed as currency;
   receiving a travel planning query that includes both a departure location and a request associated with redemption of award credits;
   determining, by the one or more computer systems, using the rules encoded in the fare by rule data structures, a plurality of travel itineraries in response to the travel planning query, said plurality of travel itineraries comprising flights meeting both the requirements of availability for an award redemption and the departure location;
   determining by one or more computer systems, using the rules encoded in the fare by rule data structures, a set of pricing solutions for the flights in the set of travel itineraries wherein the cost of each flight is determined using the fare rules and frequent travel award redemption program rules and values associated with the first fare amount field and the second fare amount fields, with the cost comprising a first component expressed as an award credit and a second component expressed in a currency; and
   extracting, using one or more computer systems, a subset of the set of pricing solutions; and
   providing instructions by the one or more computer systems to present the plurality of travel itineraries and the subset of the set of pricing solutions with the cost of one or more flights in the subset of solutions.

2. The method of claim 1 wherein the field to indicate the award credit expresses the award credit as a mileage credit.

3. The method of claim 2 comprising applying a value associated with the specified fare field on a pricing unit basis.

4. The method of claim 2 wherein the defined data structures comprise a category 25 record 3 ATPCO data structure.

5. The method of claim 2 wherein a value for the currency field indicates the fare is associated with a co-payment in addition to an award credit.

6. The method of claim 5 wherein the defined data structures comprise a category 25 record 3 ATPCO data structure.

7. The method of claim 1 wherein a value for the currency field indicates that the co-payment in the currency field is in addition to the award credit.

8. The method of claim 1 comprising defining an "AND" relationship between the first fare and second fare fields.

9. The method of claim 1 wherein the defined data structures comprise a category 25 record 3 ATPCO data structure.

10. The method of claim 1 wherein the defined data structures comprise a category 25 record 3 ATPCO data structure.

11. The method of claim 1 further including applying a filter to remove flights from the set of pricing solutions that are not available for booking.

12. The method of claim 1 further including applying a filter to the set of travel itineraries to remove flights that are not available for booking prior to determining the cost of each flight in the set of pricing solutions.

13. A system comprising:
a computing device adapted to:
receive rules encoded in fare by rule data structures, defined by a third-party non-airline carrier, said fare by rule data structures including rules for at least one frequent travel award redemption program, with the rules comprising fare rules that govern whether fares can be used with flights to provide travel itineraries and frequent travel award redemption program rules that govern redemption of award credits, the frequent travel award redemption program rules including fields to indicate a first fare amount expressed as an award credit and a second fare amount expressed as currency;
receive a travel planning query that includes both a departure location and request associated with redemption of award credits;
determine, using the rules encoded in the fare by rule data structures, a plurality of travel itineraries in response to the travel planning query, said plurality of travel itineraries comprising flights meeting both the requirements of availability for an award redemption and the departure location; and
determine, using the rules encoded in the fare by rule data structures, a set of pricing solutions for the flights in the set of travel itineraries wherein the cost of each flight is determined using the fare rules and frequent travel award redemption program rules and values associated with the first fare amount field and the second fare amount fields, with the cost comprising a first component expressed as an award credit and a second component expressed in a currency; and
extract a subset of the set of pricing solutions; and
provide instructions by the one or more computers to present the plurality of travel itineraries and the subset of the set of pricing solutions with the cost of one or more flights in the subset of solutions.

14. The system of claim 13 wherein the field to indicate the award credit expresses the award credit as a mileage credit.

15. The system of claim 14 comprising applying a value associated with the specified fare field on a pricing unit basis.

16. The system of claim 14 wherein the defined data structures comprise a category 25 record 3 ATPCO data structure.

17. The system of claim 14 wherein a value for the currency field indicates the fare is associated with a co-payment in addition to an award credit.

18. The system of claim 13 wherein a value for the currency field indicates that the co-payment in the currency field is in addition to the award credit.

19. The system of claim 13 wherein the computing device is further adapted to apply a filter to remove flights from the set of pricing solutions that are not available for booking.

20. The system of claim 13 wherein the computing device is further adapted to apply a filter to the set of travel itineraries to remove flights that are not available for booking prior to determining the cost of each flight in the set of pricing solutions.

21. A computer program product, tangibly embodied in an information carrier, the computer program product comprising instructions operable to cause data processing apparatus to:
receive rules encoded in fare by rule data structures defined by a third-party non-airline carrier, said fare by rule data structures including rules for at least one frequent travel award redemption program, with the rules comprising fare rules that govern whether fares can be used with flights to provide travel itineraries and frequent travel award redemption program rules that govern redemption of award credits, the frequent travel award redemption program rules including fields to indicate a first fare amount expressed as an award credit and a second fare amount expressed as currency;
receive a travel planning query that includes both a departure location and a request associated with redemption of award credits;
determine, using the rules encoded in the fare by rule data structures, a plurality of travel itineraries in response to the travel planning query, said plurality of travel itineraries comprising flights meeting both the requirements of availability for an award redemption and the departure location;
determine, using the rules encoded in the fare by rule data structures, a set of pricing solutions for the flights in the set of travel itineraries wherein the cost of each flight is determined using the fare rules and frequent travel award redemption program rules and values associated with the first fare amount field and the second fare amount field, with the cost comprising a first component expressed as an award credit and a second component expressed in a currency; and
extract, using one or more computer systems, a subset of the set of pricing solutions; and
provide instructions by the one or more computer systems to present the plurality of travel itineraries and the subset of the set of pricing solutions with the cost of one or more flights in the subset of solutions.

22. The computer program product of claim 21 wherein the field to indicate the award credit expresses the award credit as a mileage credit.

23. The computer program product of claim 22 further comprising instructions to apply a value associated with the specified fare field on a pricing unit basis.

24. The computer program product of claim 22 wherein the defined data structures comprise a category 25 record 3 ATPCO data structure.

25. The computer program product of claim 22 wherein a value for the currency field indicates the fare is associated with a co-payment in addition to an award credit.

26. The computer program product of claim 21 wherein a value for the currency field indicates that the co-payment in the currency field is in addition to the award credit.

27. The computer program product of claim 21 further including instructions to apply a filter to remove flights from the set of pricing solutions that are not available for booking.

28. The computer program product of claim 21 further including instructions to apply a filter to the set of travel itineraries to remove flights that are not available for booking prior to determining the cost of each flight in the set of pricing solutions.

* * * * *